(12) United States Patent
Fallon

(10) Patent No.: US 9,917,763 B2
(45) Date of Patent: Mar. 13, 2018

(54) METHOD AND APPARATUS FOR ANALYZING A SERVICE IN A SERVICE SESSION

(71) Applicant: Telefonaktiebolaget L M Ericsson (publ), Stockholm (SE)

(72) Inventor: Liam Fallon, Westmeath (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 243 days.

(21) Appl. No.: 14/416,357

(22) PCT Filed: Apr. 30, 2013

(86) PCT No.: PCT/EP2013/059015
§ 371 (c)(1),
(2) Date: Jan. 22, 2015

(87) PCT Pub. No.: WO2014/016004
PCT Pub. Date: Jan. 30, 2014

(65) Prior Publication Data
US 2015/0180759 A1    Jun. 25, 2015

Related U.S. Application Data

(60) Provisional application No. 61/676,478, filed on Jul. 27, 2012.

(51) Int. Cl.
G06F 15/173    (2006.01)
H04L 12/26    (2006.01)
(Continued)

(52) U.S. Cl.
CPC .......... H04L 43/50 (2013.01); H04L 41/5009 (2013.01); H04L 41/5032 (2013.01);
(Continued)

(58) Field of Classification Search
USPC ................................. 709/224, 223, 227, 222
See application file for complete search history.

(56) References Cited

U.S. PATENT DOCUMENTS

2003/0212778 A1   11/2003   Collomb
2012/0151009 A1*  6/2012   Bouazizi ............. H04L 41/5067
                                                                        709/219
(Continued)

FOREIGN PATENT DOCUMENTS

CN            1435782 A       8/2003   ............. G05F 17/40

OTHER PUBLICATIONS

"Next Generation Mobile Networks Use Cases related to Self Organising Network, Overall Description," *NGMN Alliance*, May 31, 2007.
(Continued)

*Primary Examiner* — Lan-Dai T Truong
(74) *Attorney, Agent, or Firm* — Baker Botts, LLP

(57) ABSTRACT

A service provided to an end user in a service session is analyzed. A plurality of measurements of at least one performance parameter of a network providing a service to an end user in a service session is received (501). The received plurality of measurements of the at least one performance parameter are divided (503) into a plurality of snapshots. The service is analyzed (505) by determining the compliance of the received measurements to the expectations of the end user for that service session within a snapshot.

15 Claims, 17 Drawing Sheets

(51) Int. Cl.
*H04L 29/08* (2006.01)
*H04L 12/24* (2006.01)
(52) U.S. Cl.
CPC ........ *H04L 41/5067* (2013.01); *H04L 43/067* (2013.01); *H04L 43/0876* (2013.01); *H04L 67/16* (2013.01); *H04L 41/024* (2013.01); *H04L 41/0233* (2013.01); *H04L 41/0266* (2013.01); *H04L 41/145* (2013.01); *H04L 41/16* (2013.01); *H04L 41/5022* (2013.01)

(56) References Cited

U.S. PATENT DOCUMENTS

2012/0290651 A1\* 11/2012 Westbrooke ............. H04Q 9/00
709/204
2013/0124139 A1\* 5/2013 Gunnarsson ........ H04W 64/003
702/150

OTHER PUBLICATIONS

François Toutain et al., "Interpersonal Context-Aware Communication Services," *IEEE Communications Magazine*, Jan. 2011.
"Information Framework (SID)," GB922 0-P, Version 1.6, *TM Forum*, 2011, 46 pages.
"Resource Description Framework (RDF) Model and Syntax Specification," REC-rdf-syntax-19990222, W3C Recommendation, *W3C*, Feb. 22, 1999, 43 pages.
OWL 2 Web Ontology Language Document Overview (Second Edition), W3C Recommendation, *W3C*, Dec. 11, 2012, 7 pages.
Martin Serrano et al., "A Formal Approach for the Inference Plane Supporting Integrated Management Tasks in the Future Internet," *IEEE*, 2009.
Nigel Sheridan-Smith et al., "A Policy-based Service Definition Language for Service Management," *IEEE*, 2006.
Henar Muñoz Frutos et al., "Enhancing Service Selection by Semantic QoS," *Springer-Verlag Berlin Heidelberg*, 2009.
John Keeney et al. , "Approaches to Relating and Integrating Semantic Data from Heterogeneous Sources," 2011 IEEE/WIC/ACM International Conferences on Web Intelligence and Intelligent Agent Technology, *IEEE*, 2011.
Jorge E. López de Vergara et al., "Ontology-Based Network Management: Study Cases and Lessons Learned," *Springer Science+Business Media, LLC*, May 28, 2009.
"Technical Report: Managing the Quality of Customer Experience, Customer Experience, Service Level Agreements, and end to end Service Quality Management," Release 1.0 TR 148, Version 0.9, *TM Forum*, Nov. 2009.
"SLA Management Handbook," Release 3.0, GB917, Version 0.9, TM Forum, Jan. 2011.
Rafal Stankiewicz et al., "Accepted From Open Call—QoX: What is It Really?," *IEEE Communications Magazine*, Apr. 2011.
B. Claise et al., "Specification of the IP Flow Information Export (IPFIX) Protocol for the Exchange of IP Traffic Flow Information" Network Working Group Request for Comments: 5101, Category: Standards Track, *The IETF Trust*, Jan. 2008.
Liam Fallon et al., "GSQR: A Generic Service Quality Reporting Protocol for Terminals", 2014.
D. Harrington et al., "An Architecture for describing Simple Network Management Protocol (SNMP) Management Frameworks," Network Working Group Request for Comments: 3411, STD: 62, Obsoletes: 2571, Category: Standards Track, *The Internet Society*, 2002.

K. McCloghrie et al., "Structure of Management Information Version 2 (SMIv2)," Nework Working Group Request for Comments: 2578, STD: 58, Obsoletes: 1902, Category: Standards Track, *The Internet Society*, 1999.
"CIM Schema 2.28.0 Release Notes," *Distributed Management Task Force, Inc.*, 2011.
3rd Generation Partnership Project; Technical Specification Group Services and System Aspects; Telecommunication management; Evolved Universal Terrestrial Radio Access Network (E-UTRAN) Network Resource Model (NRM) Integration Reference Point (IRP); Information Service (IS), Release 11, 3GPP TX 32.762 V11.1.0 (Mar. 2012), *3GPP Organizational Partners*.
M. Garschhammer et al., "Towards generic Service Management Concepts A Service Model Based Approach," 7th IEEE/IFIP International Symposium on Integrated Network Management, *IEEE Publishing*, May 2001, 14 pages.
Gabi Dreo Rodosek, "A Generic Model for IT Services and Service Management," 2003.
Viktor Leijon et al., "SALmon—A Service Modeling Language and Monitoring Engine," 2008 IEEE International Symposium on Service-Oriented System Engineering, *IEEE*, 2008.
John Strassner et al., "DEN-ng: Achieving Business-Driven Network Management," *IEEE*, 2002.
RDF Vocabulary Description Language 1.0: RDF Schema, W3C Recommendation, W3C, Feb. 10, 2004.
"SPARQL Query Language for RDF," W3C Recommendation, *W3C*, Jan. 15, 2008.
"SWRL: A Semantic Web Rule Language Combining OWL and RuleML," W3C Member Submission, *National Research Council of Canada, Network Inference, and Stanford University*, May 21, 2004.
Alfredo Salvador, "A Semantically Distributed Approach to Map IP Traffic Measurements to a Standardized Ontology," *International Journal of Computer Networks & Communications (IJCNC)*, vol. 2, No. 1, Jan. 2010.
"Lossless Translation of Arbitrary Modeling Language Into OWL," 2011.
Declan O'Sullivan et al., "Understanding as We Roam," *IEEE Computer Society*, 2007.
John Keeney et al., "Ontological Semantics for Distributing Contextual Knowledge in Highly Distributed Autonomic Systems," Journal of Network and Systems Management, vol. 15, No. 1, *Springer Science+Business Media, LLC*, Mar. 2007.
"Semantic Annotations for WSDL and XML Schema," W3C Recommendation, *W3C*, Aug. 28, 2007.
Erik Christensen et al., "Web Services Description Language (WSDL) 1.1", W3C Note, *Ariba, International Business Machines Corporation, Microsoft*, Mar. 15, 2001.
Kunal Verma et al., "Semantically Annotating a Web Service," *IEEE Computer Society*, 2007.
Elyes Lehtihet et al."Towards Integrating Management Interfaces," *IEEE*, 2008.
Liam Fallon et al., "Using a Semantic Knowledge Base for Communication Service Quality Management in Home Area Networks," *IEEE*, 2012.
John Strassner et al., "Ontologies in the Engineering of Management and Autonomic Systems: A Realty Check," Journal of Network and Systems Management, vol. 15, No. 1, *Springer Science+Business Media, LLC*, 2007.
Corresponding Chinese Application Search Report dated, Apr. 7, 2017.
International Search Report for International application No. PCT/EP2013/059015, dated Aug. 9, 2013.
Chinese Office Action and Search Report, Application No. 201380050809.9, dated Sep. 12, 2017.

\* cited by examiner

METHOD AND APPARATUS FOR ANALYZING A SERVICE IN A SERVICE SESSION

PRIORITY

This nonprovisional application is a U.S. National Stage Filing under 35 U.S.C. § 371 of International Patent Application Serial No. PCT/EP2013/059015, filed Apr. 30, 2013 and entitled "A Method and Apparatus for Analysing A Service In A Service Session" which claims priority to U.S. Provisional Patent Application No. 61/676,478 filed Jul. 27, 2012, both of which are hereby incorporated by reference in their entirety.

TECHNICAL FIELD

The present invention relates to a method and apparatus for analysing a service provided to an end user in a service session. It also relates to a method and apparatus for optimising the provision of services to an end user to access and optimise the quality of the end user service sessions.

BACKGROUND

Automatically assessing and optimizing the quality of end user service sessions being carried on a network is a requirement of modern network operators. It is a challenging task because of the myriad of application session types now extant in networks and because of the sheer volume of end user sessions in progress at any one time. It is necessary to monitor and understand a vast amount of disparate data in order to deduce the quality that is being experienced on sessions and to suggest optimizations to a network that might improve the quality experience. The service session delivery context as well as the raw service metrics must be understood in order to get a full picture of the service quality.

Current information modelling practice is to model information statically, typically using Unified Modelling Language (UML) models or more primitive XML schemas to describe the structure of information. The meaning of a certain type of information and its relationships with other types of information is not captured in such models; linking and adding meaning to data is carried out using adapters, mappers, and translators implemented as computer programs.

Much work has been carried out in the field of semantic modelling where the structure, meaning, and references of models are captured using technologies such as Resource Description Framework (RDF) graphs and ontologies written in languages such as Ontology Web Language (OWL). Such models can themselves be executed, without the need for adapters, mappers, and translators.

To date, semantic approaches have only been suggested in very limited applications in the field of Network Management, for example, as disclosed by M. Serrano, J. Strassner, and M. Foghlu, "A Formal Approach for the Inference Plane Supporting Integrated Management Tasks in the Future Internet", *Integrated Network Management-Workshops, 2009. IM '09, IFIP/IEEE International Symposium on*, pages 120-127, June 2009; N. Sheridan-Smith, T. O'Neill, J. Leaney, and M. Hunter, "A Policy-based Service Definition Language for Service Management", *Network Operations and Management Symposium, 2006. NOMS 2006. 10th IEEE/IFIP*, pages 282-293, April 2006, and H. Muñoz Frutos, I. Kotsiopoulos, L. Vaquero Gonzalez, and L. Rodero Merino, "Enhancing Service Selection by Semantic QoS", L. Aroyo, P. Traverso, F. Ciravegna, P. Cimiano, T. Heath, E. Hyvönen, R. Mizoguchi, E. Oren, M. Sabou, and E. Simperl, editors, *The Semantic Web: Research and Applications*, volume 5554 of *Lecture Notes in Computer Science*, pages 565-577, Springer Berlin/Heidelberg, 2009. This limited application is partly due to the application of reasoning, querying, and rules to large semantic models is a performance challenge, see for example, Keeney, J. and Boran, A. and Bedini, I. and Matheus, C. J. and Patel-Schneider, P. F. "Approaches to Relating and Integrating Semantic Data from Heterogeneous Sources", *Web Intelligence and Intelligent Agent Technology (WI-IAT), 2011 IEEE/WIC/ACM International Conference on*, volume 1, pages 170-177, August. 2011; and J. López de Vergara, A. Guerrero, V. Villagrá, and J. Berrocal, "Ontology-Based Network Management: Study Cases and Lessons Learned", *Journal of Network and Systems Management*, 17:234-254, 2009.

One existing solution is to use Ipoque (www.ipoque.com) which supports the list of protocols and applications. The packet inspection library of such a system runs to 4 pages of tightly packed text, i.e. a large amount of application protocols exist. Understanding each application and tuning a network to give the best balance of performance across the set of services currently running in the network would be difficult with such a large amount of protocols.

Automated service analysis and optimization may consider the service expectations for a set of services at the service consumption point. These may be set, agreed and actively managed. Once these expectations have been agreed, the actual service experience and service context that users are experiencing is monitored. The service context may be adjusted to optimize service delivery. It is desirable that any system that addresses these challenges is adaptable, highly flexible, and operates with minimal human intervention.

Service expectations are a balance struck between quality, cost, and resource efficiency for the delivery of services. Contracts such as Service Level Agreements (SLAs) are often used to express service expectations where service delivery crosses organizational boundaries. Service expectations are not formally set with service providers such as video streaming service that utilise pure Internet connectivity. End users usually subscribe for a certain bandwidth level or bundle that implicitly sets a service expectation. The service experience is the quality of service (QoS) of a service measured at the point of delivery and the quality of experience (QoE) of the service as perceived by the end user. Although the raw statistics that give QoS measurements for the quality of a service are important, those measurements must be viewed in the overall context of the service delivery to be properly understood. The service context is that set of factors which can affect service quality.

One example of a source of end user service experience and service context of existing systems is the use of counters to report network metrics. A vast number of counters are available, aggregating metrics such as packet loss, delay, and jitter as well as on network events such as equipment failures and overloads. Counters are also used to report on logical entities such as Virtual Local Area Networks (VLANs) and MultiProtocol Label Switching (MPLS) tunnels. Simple Network Management Protocol (SNMP) Management Information Bases (MIBs) and the 3GPP PM Integration Reference Point (IRP) are just two of very many standards that specify counters and counter handling.

Event-based metric collection, where network elements report metrics on significant events in bearer and control sessions, are increasingly being used to provide a rich source of data of end user service experience and service context. Event-based metrics may be collected from Evolved Universal mobile telecommunication system Terrestrial Radio Access Network (UTRAN) Node B (eNodeB) nodes, Serving GPRS Serving Node (SGSN) nodes, Gateway General packet radio system Support Node (GGSN), nodes and MME nodes. Internet Protocol Flow Information eXport (IPFIX) may be used to stream reports of events on (IP) flows from network elements.

Reporting directly from service terminals is one of the most accurate ways of evaluating end user service context. Service experience metrics available in terminal reports include QoS metrics such as packet loss and latency, and QoE estimations made by algorithms running in the terminal. Terminal reports also report context information such as the service user, the location of service delivery, and device information such as processor load, memory usage, disk space, and remaining energy.

Standardization activities for terminal reporting are specific to particular service or networking domains. Real Time Transport Control Protocol (RTCP) is used for quality reporting on Real Time Transport Protocol (RTP) based streaming services. The 3GPP use terminal reports to monitor Packet-switched Streaming Service (PSS), Multimedia Broadcast Multicast Service (MBMS) and Multimedia Telephony (MMTel) sessions. As there is no common standard for terminal reporting, Generic Service Quality Reporting Protocol (GSQR) has been proposed as a unified approach for terminal reporting as disclosed, for example, by WO2010/066288 and WO2012/084010.

Probes can be used to report events on signalling and bearer links at IP, Transport Control protocol (TCP), and application protocol level and can give very detailed information on application, session, and individual user level. Packet capture streams are intercepted by hardware probes and can be passed through analysers such as Ipoque to classify the packets. Probes necessitate the installation of specialized equipment in the network and a tap point to intercept packets.

Management systems such as billing systems and customer relationship management systems may also contain relevant contextual information on users and usage. They give information such as the type of accounts users have and the amount of money being spent by users. Network planning systems have information on the current and planned deployment of network equipment. Business management systems have information on the business strategies and rules for particular network services offered to customers.

End user services can be affected by weather and other natural phenomena. Sources of such contextual information can be used to explain why service degradation has occurred. For example, a storm can cause a transitory degradation in mobile network service that has a knock on effect of end user service degradation. However, there is no requirement to optimize the network in such a case because the storm will pass.

Other systems such as news systems or systems that give schedules of upcoming popular sporting events or concerts are also valuable sources of information. They can help explain abnormal concentrations of user activity, perhaps due to some celebrity related happening or due to a rock concert being held in a rural area.

Although there is a long history of modelling in the telecommunication domain, the focus has been largely on network equipment and resource models rather than on services being carried by networks. SNMP MIBs described in Structure of Management Information (SMI), the Distributed Management Task Force's Common Information Model (DMTF's CIM), and 3GPP IRP models such as the E-UTRAN Network Resource Model (NRM) are typical of such models.

Some work has been undertaken in modelling telecommunication services. One approach is to describe a generic telecommunication service model that identifies service relationships such as user, functionality, and QoS parameters. Another approach uses service template models to describe a service in terms of a generic service model. The TM-Forum's Shared Information/Data (SID) Model is a generic service model with relationships and mappings between service entities described conceptually as either a uses or a requires relationship.

All of the models and approaches above capture the static structure of the information, but do not capture the meaning of the models nor the linkages between the models in a way that allows the models be processed by machines.

There have been some attempts to build executable models for telecommunication services. SALmon is a domain specific language for service modelling, allowing specification of service model instances using programming language like specifications. The disadvantage of this approach is that all model specifications must be programmed. Another known approach is to model telecommunication services as policies. In Directory Enabled Networks-Next Generation (DEN-ng), services sit in the Business View of the Policy Continuum. The DEN-ng is a comprehensive unifying model that encompasses the entire domain of network management. The drawbacks of this model are that it is tightly integrated, assumes a policy management infrastructure is in place, and is not open.

Semantic models, known as ontologies, capture the structure and meaning of the concepts and relationships in a domain in a formal manner, with constraints and restrictions formally expressed. The natural language text and annotations often used on UML models to express complex relationships and restrictions can be written into ontologies as part of the model. Ontologies can have varying degrees of semantic richness; the amount and type of knowledge stored in the ontology. Simple ontologies such as taxonomies describe only the hierarchy of a set of concepts whereas more complex ontologies capture complex relationships as axioms and rules. Machines can process ontologies if they are properly written.

Resource Description Framework (RDF) descriptions are used to capture simple ontologies. In RDF, the concepts in a domain are modelled as nodes on a directed graph, with relationships between concepts represented as arcs between nodes. RDF can be shown graphically or in a number of notations including XML. RDF Schema (RDFS) extends RDF to allow concepts to be classed and properties of concepts to be expressed.

More complex ontologies are expressed in languages such as OWL, the Web Ontology Language. OWL is, in fact, a family of languages that have varying degrees of expressiveness. The flavours of OWL with high expressiveness have higher computational demands than those with lower expressiveness. OWL is a subset of RDF and is more expressive than RDF. It allows more complex class hierarchical relationships such as equivalence and unions to be expressed. It supports specification of restrictions and cardinalities on properties. Characteristics such as transitiveness and symmetry can be given to the relationships between concepts. Rules can be applied to the ontology using rule languages such as Semantic Web Rule Language (SWRL).

The strength of ontologies is that they can capture complex relationships across disparate knowledge domains and that knowledge can be captured in the model without the need for a large amount of programmed mappers, adapters, and translators.

A knowledge base holds the ontology definition and the actual knowledge of ontology. Once the structure, constraints, axioms, and rules have been specified, the ontology is populated with instances of concepts (individuals). A reasoner is used to infer knowledge in the knowledge base, as individuals are inserted into the ontology and the reasoner runs, working out the relationships between the concepts. The SPARQL Protocol and RDF Query Language (SPARQL) can be used to retrieve knowledge from the knowledge base.

Semantic models have the richness to describe the complex relationships that exist between the disparate models that describe the expectations, experience, and context of end user services. However, to date, little work has been undertaken in building such models.

The Ontology for Support and Management is disclosed by M. Serrano, J. Strassner, and M. Foghlu, "A Formal Approach for the Inference Plane Supporting Integrated Management Tasks in the Future Internet", *Integrated Network Management-Workshops, 2009. IM '09. IFIP/IEEE International Symposium on*, pages 120-127, June 2009. This system captures changes to user, location, device, and service context as events that trigger policies associated with entities modelled in DEN-ng. The BREIN ontology disclosed by H. Muñoz Frutos, I. Kotsiopoulos, L. Vaquero Gonzalez, and L. Rodero Merino, "Enhancing Service Selection by Semantic QoS", L. Aroyo, P. Traverso, F. Ciravegna, P. Cimiano, T. Heath, E. Hyvönen, R. Mizoguchi, E. Oren, M. Sabou, and E. Simperl, editors, *The Semantic Web: Research and Applications*, volume 5554 of *Lecture Notes in Computer Science*, pages 565-577. Springer Berlin/Heidelberg, 2009 is an OWL ontology that defines basic QoS concepts for connectivity services provided by telecommunication networks.

Of course, it is possible to use UML models as a basis for ontology design. In some cases, it is possible to translate well-specified UML models into an ontology described in OWL. Guillaume Hillairet, Zoltán Theisz, Epifanio Salamanca Cuadrado, and David Cleary did just that and translated the TM Forum's SID model into ontology in OWL. Of course, general-purpose ontologies can be used to model non-telecommunication aspects of end user service context.

Ontology mapping is used to map relationships between concepts across ontologies. Keeney et al. J. Keeney, D. Lewis, and D. O'Sullivan, "Ontological Semantics for Distributing Contextual Knowledge in Highly Distributed Autonomic Systems", *Journal of Network and Systems Management*, 15:75-86, 2007 use ontology mappings in a Knowledge Based Network to enable semantic interoperability between producers and consumers of network information. The Knowledge Based Network allows producers to publish and consumers to subscribe to knowledge. Information models describing knowledge to be published into the system are analysed off line to produce deployable run time mappings. This means that information in any form, once mapped, can be published into or consumed from the system. Reasoning is used to determine which set of mappings should be used for a particular event forwarding operation.

Semantic lifting is used to translate information into a semantic form. Semantic Annotations for Web Services Description Language (SAWSDL) is used to annotate element definitions in XML schemas with semantic references and mappings that translate XML element information to semantic knowledge. SAWSDL is primarily used to annotate WSDL web service definitions. Lehtihet and Agoulmine E. Lehtihet and N. Agoulmine, "Towards integrating Management Interfaces", *Network Operations and Management Symposium, 2008. NOMS 2008. IEEE*, pages 807-810, April 2008 describe an approach for reusing information from SMI and CIM models by mapping those models to a common UML structure, which is then transformed to XML schemas. Those XML schemas are then annotated with SAWSDL. Frutos et al. H. Munoz Frutos, I. Kotsiopoulos, L. Vaquero Gonzalez, and L. Rodero Merino, "Enhancing Service Selection by Semantic QoS", L. Aroyo, P. Traverso, F. Ciravegna, P. Cimiano, T. Heath, E. Hyvönen, R. Mizoguchi, E. Oren, M. Sabou, and E. Simperl, editors, *The Semantic Web: Research and Applications*, volume 5554 of *Lecture Notes in Computer Science*, pages 565-577, Springer Berlin/Heidelberg, 2009, describe an approach where semantic annotation is used to annotate Service Level Agreement (SLA) templates that are used in automated contract negotiations in service com-position. A service composition QoS ontology is used as a model, and different services advertise their capabilities by using SAWSDL annotations to reference the QoS model.

A framework for translating terminal reports in XML format into RDF class individuals and references between those individuals is disclosed by L. Fallon and D. O'Sullivan, "Using a Semantic Knowledge Base for Communication Service Quality Management in Home Area Networks", *Network Operations and Management Symposium, 2012. NOMS 2012. 13th IEEE/IFIP. NOMS 2012*, April 2012. This framework can translate an entire terminal report into RDF individuals in tens of milliseconds.

In order to automate analysis and optimization of end user services, the service expectations, service experience, and service context in which those services are delivered must be managed. As mentioned above, this is a difficult problem because of the variety and volume of services and data on those services that is available. To date, no holistic model for and mechanism for end user service analysis and optimization has been proposed.

As mentioned above, ontologies enable model interoperability, facilitate incremental modelling, are expressively rich, and allow the use of models from various sources. However, initial costs of building models are substantial, semantic content in models varies in detail, and tooling for ontologies is immature as mentioned, for example, in J. Strassner, D. O'Sullivan, and D. Lewis. "Ontologies in the engineering of management and autonomic systems: A reality check", *Journal of Network and Systems Management*, 15:5-11, 2007; and Keeney, J. and Boran, A. and Bedini, I. and Matheus, C. J. and Patel-Schneider, P. F, "Approaches to Relating and Integrating Semantic Data from Heterogeneous Sources", *Web Intelligence and Intelligent Agent Technology (WI-IAT), 2011 IEEE/WIC/ACM International Conference on*, volume 1, pages 170-177, August. 2011.

There are also performance issues with using ontologies, see for example, Keeney, J. and Boran, A. and Bedini, I. and Matheus, C. J. and Patel-Schneider, P. F, "Approaches to Relating and Integrating Semantic Data from Heterogeneous Sources", *Web Intelligence and Intelligent Agent Technology (WI-IAT), 2011 IEEE/WIC/ACM International Conference on*, volume 1, pages 170-177, August. 2011.; and J. López de Vergara, A. Guerrero, V. Villagrá, and J. Berrocal, "Ontology-Based Network Management: Study Cases and Lessons Learned", *Journal of Network and Systems Management*, 17:234-254, 2009. Reasoners are slow when used on ontologies with large numbers of instances and large ontologies are expensive to store in memory. Keeney et al. describe the trade-offs in performance between using queries, rules, and reasoning when retrieving knowledge. Typical performance figures for retrieval times vary from 500 ms to 1.5 seconds even for knowledge bases with a small number of individuals.

In summary, existing solutions exhibit the following problems: the amount of services that exist and the amount of data available on those services makes automated optimization of networks to carry those services difficult; there is no holistic model for managing the expectations, experience, and context of end user services; and applying semantic techniques to the problem has promise but those techniques are known to have performance problems.

SUMMARY

The present invention seeks to obviate at least some of the disadvantages of the prior art systems and provide an improved method and apparatus for analysing and/or optimising end user services.

This is achieved, according to one aspect of the present invention, by a method of analysing a service provided to an end user in a service session, the method comprising the steps: receiving a plurality of measurements of at least one performance parameter of a network providing a service to an end user in a service session; dividing the received plurality of measurements of the at least one performance parameter into a plurality of snapshots; and analysing the service by determining the compliance of the received measurements to the expectations of the end user for that service session within a snapshot.

This is achieved, according to another aspect of the present invention, by a method of optimising the provision of services to an end user, the method comprising the steps of: analysing a plurality of services provided in a network according to the method of the aspect above; calculating a metric that represents the compliance of the service session to the expectations and storing the calculated metric into the service session, wherein the step of analysing the service comprises periodically determining if the compliance of each of the plurality of metrics for a plurality of snapshots meets the expectations; determining if and what network optimization should be applied to the network to improve the level of conformance of services for services determined not conforming to expectations based on a priority level assigned to the service session; and optimizing the performance of the network based on the determination of if and what network optimization should be applied.

This is also achieved, according to yet another aspect of the present invention, by an apparatus for analysing a service provided to an end user in a service session, the apparatus comprising: a receiver module configured to receive a plurality of measurements of at least one performance parameter of a network providing a service to an end user in a service session and to divide the received plurality of measurements of the at least one performance parameter into a plurality of snapshots; and an analyser module configured to analyse the service by determining the compliance of the receive measurements to the expectations of the end user for that service session within a snapshot.

This is also achieved, according to yet another aspect of the present invention, by an apparatus for optimising the provision of telecommunication services to an end user, the apparatus comprising: the apparatus of the aspect above and the analyser module is further configured to analyser a service by determining periodically if the compliance of each of the plurality of metrics in a plurality of snapshots meet the expectations. The apparatus further comprises an optimiser module configured to determine if and what network optimization should be applied to the network to improve the compliance of services for services determined not conforming to expectations based on a priority level assigned to the service session and to optimize the performance of the network based on the determination of if and what network optimization should be applied.

The present invention provides a method and apparatus for automatic analysis and optimization of end user services. In an embodiment, a semantic knowledge base is used to hold knowledge about the end user services being analysed and optimized. An analyser uses the knowledge base to analyse and optimize the services being managed and an optimiser uses the knowledge base to optimise the services.

In an embodiment, the method uses a knowledge base to hold knowledge on the service expectations, experience, and context of end user service sessions running in the managed domain. A semantic technique is used, with a service management ontology being employed to model the end user services. To overcome the performance constraints of semantic querying, reasoning, and rule execution, the end user service session knowledge in the knowledge base is partitioned. Service session knowledge that has a time dimension is partitioned into snapshots of a certain configurable length. This knowledge base partitioning means that semantic queries, reasoning, and rules need only act on relevant snapshots thus reducing the volume of input knowledge and increasing performance.

In one embodiment Semantic Service Analysis and Optimization engine collects information (knowledge) on the set of service sessions running in the domain in question, analyses the performance of those service sessions against expectations, and optimizes the network to deliver the best possible service experience in the prevailing service delivery context.

In one embodiment a method of analysing and optimisation of end user service quality comprises: receiving reports on network performance, from terminals and network elements; formatting the reports into format of a knowledge base; storing the reports in a designated time snapshot in the knowledge base; analysing contents of a time snapshot to determine how well a service met expectations; analysing contents of a number of earlier time snapshots to determine optimisation to be applied; applying the determined optimisation to the network.

Because of the use of the End User Communication Service Ontology, new services can be added to the system with no programming effort; ontology updates, a query for the new service, and a mapping to lift the service knowledge is all that is required.

In this way, the disparate knowledge required to analyse and optimize end user services is captured and linked in a way that allows it to be processed by machines. No programming is required to handle new types of services. In an embodiment, in order to introduce a new service, the service is added to a Service Management Ontology, a query for analysing the service is added to the analyser of the present invention, and a lifting translation to lift service knowledge into semantic form is added.

The knowledge in the knowledge base can be inherently structured and referenced correctly; there is no need to have separate translators, adapters, or mappers for the components in the apparatus of the present invention to understand the knowledge in the knowledge base.

In an embodiment, the method according to the aspects of the present invention use the power of semantic techniques in a way that maximizes their usefulness and applicability by scoping the way in which they are applied so that they can execute quickly and not use excessive CPU and memory resources.

Furthermore, the complexity of the domain is captured in the model and as a result the amount of programming to handle the knowledge base is relatively small.

BRIEF DESCRIPTION OF DRAWINGS

For a more complete understanding of the present invention, reference is now made to the following description taken in conjunction with the accompanying drawings in which:

FIG. 9 is a flowchart of the Loading and Lifting procedures of the start up procedure of FIG. 8a;

DETAILED DESCRIPTION

In an embodiment a service environment can be considered to comprise video on demand services; telephony services; web browsing services; and file transfer services.

The subscriber or the network operator can set some expectations on those services. Expectations might be specific to a particular user or might specify expectations on the set of services as a whole by an operator.

Expectations specific to a particular service might be; for example, for video on demand services: minimum picture quality expected, channel switching time and for telephony services: minimum voice quality, time to dial tone.

Expectations on the set of services as a whole might be expressed for common resources such as bandwidth. Bandwidth priority might be expressed with telephony services as highest priority, video on demand services next, web browsing services next, file transfer services next, and all other services get whatever bandwidth is left.

Furthermore, service expectations and service priorities may be set for each user of a service; for types of user (parent, child, student, guest); and/or for time of day/day type profiles (school night, holidays, weekends).

Figure 1:
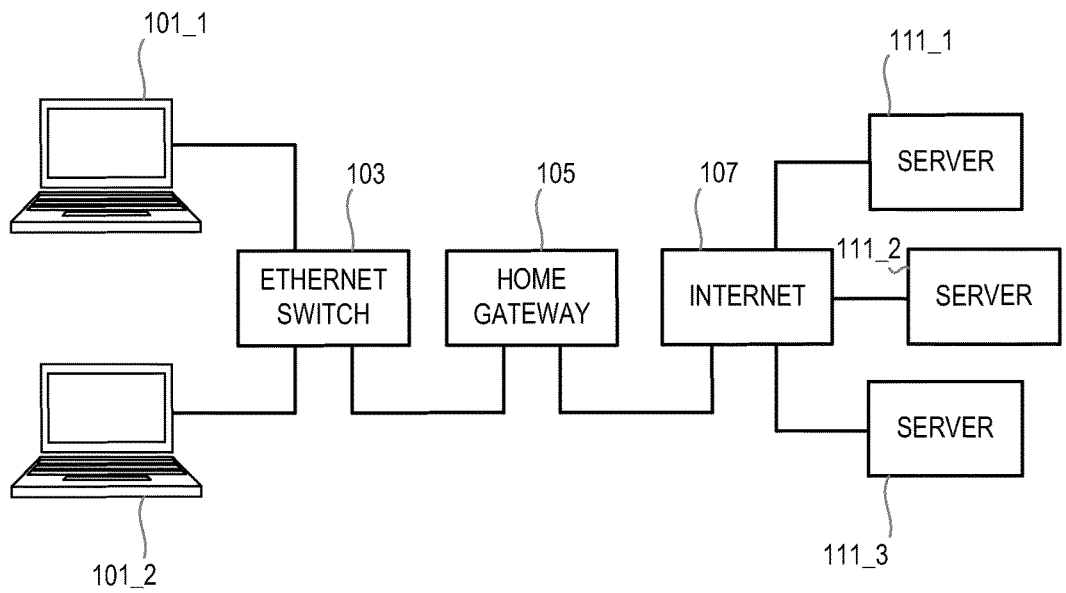
FIG. 1 is a simplified schematic of an example of a communication system including apparatus according to an embodiment of the present invention.

An embodiment of an example of a system that could utilise the present invention is shown in FIG. 1. In this example, a plurality of end user computer systems 101_1, 101_2 (for simplicity only 2 are shown in the Figure), for example, desktops, laptops, tablets, mobile telecommunication devices and the like are connected to a first Ethernet switch 103. The first Ethernet switch 103 is connected via a Home gateway 105 and the Internet 107 to a plurality of servers 111_1, 111-2, 111_3 (for simplicity only 3 are shown in the Figure) providing different telecommunications services, for example, video on demand, web browsing services, file server services.

The apparatus of the embodiment of the present invention is to be utilised in a semantic model (ontology). In other embodiments, the system knowledge could be held in a relational database, or in a custom object mode in the memory of an executing computer program. The knowledge base holds knowledge that is modelled using End User Service Analysis and Optimization (EUSAO) Ontology. That ontology models the most important concepts in the end user communication service domain, specifying the concepts, relationships between concepts, and references to other ontologies, and properties of concepts. All constraints on concepts, relationships, and properties are specified in the ontology and are enforced by the knowledge base.

All knowledge in the knowledge base is held as asserted individuals. Reasoned models are created during loading, analysis, optimization, and query operations, and are created using subsets of the knowledge in the knowledge base. For example, during analysis operations, the apparatus of the present invention uses a reasoned model containing metadata, global knowledge, and the snapshot being analysed. In order to reduce the amount of knowledge required, analysis operations operate on a single snapshot, ensuring not to use relationships between individuals across snapshots. This restricted reasoned model is sufficient for full analysis of the snapshot in question. Using this approach greatly reduces the size of models being reasoned over, making the application of reasoning both practical and efficient.

The present invention may be a server process that manages knowledge in the knowledge base and runs the analysis algorithm or analysis and optimization algorithms. The analysis and optimization algorithms run in memory and may deal with current and recently terminated sessions only. Knowledge may be persisted to knowledge repository to allow for historical reporting.

The application domain ontology is realised by a plurality of high-level concepts and object relationships. Concepts may be static (unchanged during service analysis) or dynamic (change during service analysis). The content of the static concepts may change, but these changes are controlled and happen so infrequently that the concept can be considered static during service analysis. Subscribers and users (examples of static concepts) are unlikely to be entered into the system more often than daily, whereas a dynamic concept such as a quality measurement on a session may be envisaged to change in the time frame of a small number of seconds or minutes.

In an example, the main concepts may be Service, User, ServiceSession, ServiceExpectation, and ServiceExperienceSnapshot.

In an example, a Service static concept may be any end user service such as video on demand or web browsing that is being managed. Each has a static ServiceExpectation set on it, static ServiceSessions of the service are run, and dynamic ServiceExperienceSnapshot individuals of the service are captured. A sub-concept is created for each type of service being managed, for example, for end user services such as video on demand or web browsing the sub-concepts (types of services) in the ontology may be a Video On Demand Service and a Web Browsing Service.

A static User concept models any person using a service. A User runs service sessions on a connectivity service that they have been authorized to use. The location of a User may be captured using LocationSnapshot individuals.

The static ServiceExpectation concept is an expectation that has been set on a service by a Subscriber, someone who has subscribed to a connectivity service package from an operator. The ServiceExpectation concept has <ServX>ServiceExpectation sub-concepts, one for each service being managed, in the same manner as the sub-concepts of Service above.

In an example, a ServiceSession concept models a session of a service. A service session is a session of a service run by a User on a connectivity service. The service experience of a service session is captured by the system. Again, the ServiceSession concept may have sub-concepts, one for each service being modelled, in the same manner as the sub-concepts of the Service concept mentioned above. For example an Internet Protocol Television (IPTV) session is an individual of the IPTVServiceSession concept.

The dynamic ServiceExperienceSnapshot concept models the actual metrics of a service session experienced by a user for a certain snapshot or time interval. Once again, the ServiceExperienceSnapshot concept has <ServX>ServiceExperienceSnapshopt sub-concepts, one for each service being managed, in the same manner as the sub-concepts of the Service concept mentioned above.

Service concepts model the concept of an end-user and not a connectivity service. Indeed, a ServiceSession of a Service concept may be carried by any connectivity service.

The connectivity service Subscriber, Subscription, NetworkOperator, ConnectivityServiceProvider, and ConnectivityService concepts are all static concepts. In one embodiment they are all sub-concepts of SID concepts. The Terminal, Connection, and ConnectionExperienceSnapshot concepts are dynamic concepts.

In one embodiment, the NetworkOperator concept is a sub-concept of the SID Organization concept. A NetworkOperator provides connectivity services; the provision of each connectivity service is modelled as ConnectivityServiceProvider individuals. The relationship between a network operator and a connectivity service provider is a SID party role. A ConnectivityServiceProvider is a SID ServiceProvider party role, and as such has relationships to the full set of SID service provider-related concepts.

The ConnectivityService concept models a connectivity service package offered by a network operator on a connectivity service such as a Gold Mobile Service. A connectivity service is subscribed to by a subscriber and is used by authorized users to run service sessions. A particular connection being used on a connectivity service by a terminal is modelled as a Connection concept. The ConnectionExperienceSnapshot models the actual metrics of a connection over a connectivity service experienced on a terminal for a certain snapshot or time interval. In one embodiment, each ConnectivityService is a SID ServicePackage and has relationships to all the SID service and SLA-related concepts such as "Service Specification".

A Subscriber sets expectations on services. A Subscriber has subscriptions to connectivity services such as the user's subscription to a Gold Mobile Service, which are modelled as Subscription individuals. In one embodiment, the Subscriber concept is a sub-concept of the SID Individual concept, the SID representation of a person. The relationship between a subscription and a subscriber is a SID party role. A Subscription is a SID Customer party role, and as such has relationships to the full set of SID customer-related concepts.

All people in the ontology are modelled using the Person Friend of a Friend (FOAF) concept. The User is a person, as is a Subscriber.

In another embodiment, a Subscription could be owned by an organization.

A Snapshot models a certain time interval using a Time Instant concept to capture the start of the snapshot and a Time Duration Description concept to model the duration of the snapshot. The LocationSnapshot models the location of an entity during a time interval and the ServiceExperienceSnapshot models the service experience measurements on a service during a time interval.

Significant events are used to model those events that, though external to service management, may have an influence on the actual or perceived experience of a service.

The SignificantEvent concept models a significant event that occurs at a certain location during a certain time interval. The SignificantEventFilter concept models the filter criteria used to establish if an event is significant or not.

Three sub-concepts of SignificantEvent are defined. A SignificantLeisureEvent references the Event concept from the Centre for Digital Music (C4DM) event ontology and is a sporting, music, or cultural event that may be significant. A SignificantNewsEvent references the NewsItem concept from the Papyrus News ontology and is a news event that may be significant. A SignificantWeatherEvent references the Weather concept from the NNEW Weather ontology and is a weather event that may be significant.

The SignificantEventFilter concept has three sub-concepts: the Sign ificantLeisureEventFilter, SignificantNewsEventFilter and SignificantWeatherEventFilter concepts filter the SignificantLeisureEvent, SignificantNewsEvent, and SignificantWeatherEvent individuals respectively.

Figure 2:
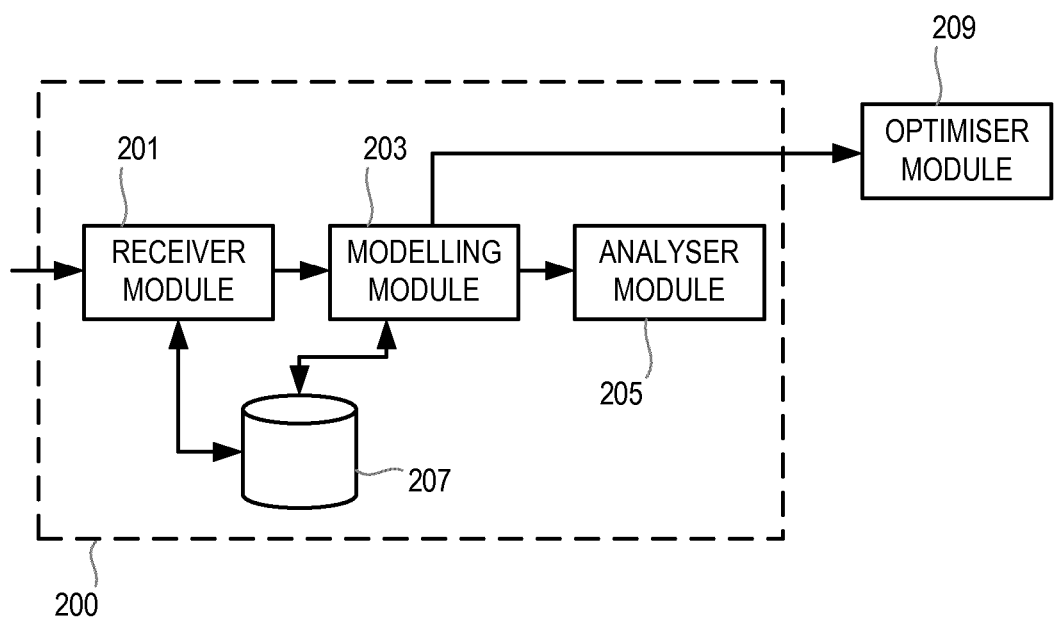
FIG. 2 is a simplified schematic of apparatus for analysing and optimising a service according to an embodiment of the present invention

The apparatus 200 for analysing a telecommunication service provided to an end user in a service session is shown in FIG. 2. The apparatus 200 comprises a receiver module 201 connected to an analyser module 205 via a modelling module 203. The receiver module 201 and the modelling module 203 are connected to a storage device 207. The output of the analyser module 205 is connected to an optimiser module 209. In an embodiment, the modelling module 203, the analyser module 205 and the optimiser module 209 may form an integrated Semantic Service Analysis and Optimisation (SSAO) engine 300 as shown in FIG. 3.

Figure 3:
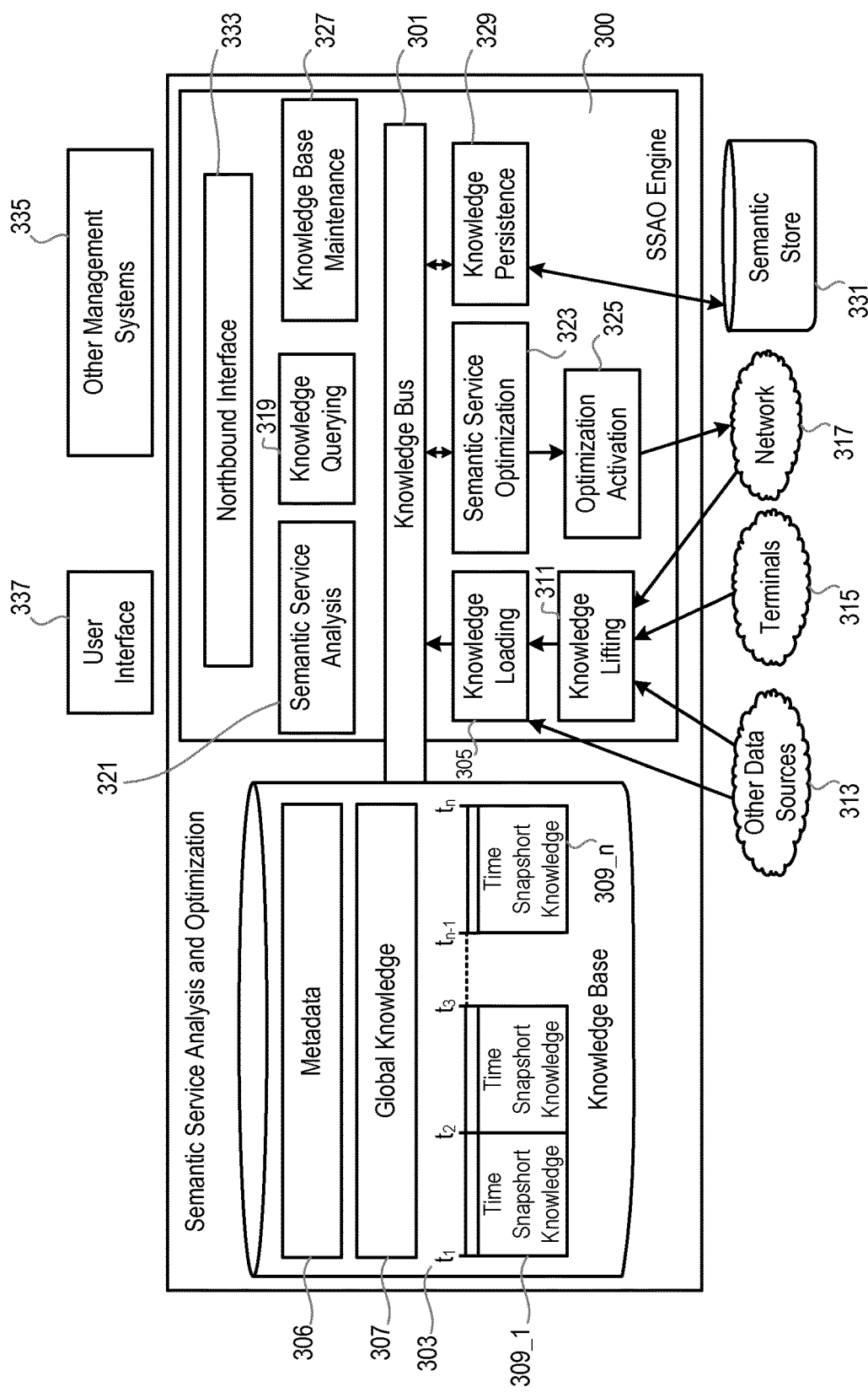
FIG. 3 is a simplified schematic of the apparatus of FIG. 2 in more detail.

The SSAO engine 300 of FIG. 3 comprises a knowledge bus 301 which is a common thread safe software interface used by all the functional blocks of the SSAO engine 300 to access and update the knowledge base 303. It provides a number of methods to components that allow them to access models, iterate over snapshots, and update knowledge in the knowledge base.

It further comprises a knowledge loading functional block 305 that takes knowledge described in RDF and loads it into the knowledge base 303. Knowledge may already be in semantic form when it comes into the SSAO engine, in which case Knowledge Loading directly processes it. Non-semantic knowledge from external systems 313, 315, 317 is pre-processed by Knowledge Lifting 311.

Knowledge loading examines the incoming semantic knowledge. Global knowledge is stored into the Global Knowledge model 307 of the knowledge base 303 and snapshot knowledge is stored into the appropriate time snapshot model 309_1 to 309_$n$ in the knowledge base. If no snapshot model exists for the snapshot period of a knowledge fragment, a new snapshot is created.

The SSAO engine 300 further comprise a knowledge lifting functional block 311 which takes information from external systems such as other data sources 313, terminals 315 and the network 317 that is not in semantic form and maps it into semantic knowledge using techniques such as SAWSDL. For example, terminal reports in XML format can be lifted into semantic form to determine the service experience and context of end user services.

Knowledge lifting 311 also handles the interfaces towards network nodes, domain managers, or external systems that are supplying information to the SSAO engine 300. Terminal reports may be forwarded using files, using streams, or using mechanisms such as eXtensible Messaging and Presence Protocol (XMPP) (eXtensible Messaging and Presence Protocol is an XML-based messaging protocol, see http://xmpp.org/) or Java Remote Method Invocation (RMI—Java RMI allows transparent server-client communication between Java virtual machines, see http://www.oracle.com/technetwork/java/javase/tech/index-jsp-136424.html).

The SSAO engine 300 further includes a knowledge querying functional block 319 which provides support for running queries in a semantic query language such as SPARQL on the knowledge base. Knowledge querying reads queries stored in files and returns the results of queries in textual format for human users or as a list of maps of name value pairs when invoked by other SSAO engine functional blocks.

Knowledge querying allows queries to be updated in run time, the query file can be edited as the system is running; the new query implementation will be used the next time the query is invoked by the system.

The SSAO engine 300 further includes an analyser functional block 321 which runs periodically at a configurable interval. It analyses snapshots that has been updated since the last run. For the snapshots, it calculates a metric that represents the compliance of each service session to its expectations and stores that metric into that service session individual in the knowledge base.

The SSAO engine 300 further includes an optimiser functional block 323 which runs periodically at a configurable interval. It looks at the compliance level of the set of services in the most recent snapshot. If some services are not conforming to expectations, it assesses applied optimizations and the priority of each service session in the snapshot to determine if and what network optimization should be applied to improve the level of conformance of services. It stores the recommended optimization to the knowledge base and calls the Optimization Activation functional block 323 to activate optimizations on the network 317.

The optimiser functional block 323 invokes Optimization Activation functional block 325 to activate an optimization it has recommended. Optimization activation applies the optimization towards the network 317 in question.

Optimization Activation 325 handles interfaces towards network nodes or domain managers, carrying out whatever operation is necessary to apply an optimization to a network. Typical operations might be execution of a command script, application of a policy or a firewall rule, or invocation of an operation on an information base.

The SSAO engine 300 further includes a Knowledge Base Maintenance functional block 327 which runs periodically at a configurable interval. It checks the knowledge base and removes snapshots that have expired; snapshots that have been held longer than the configured snapshot retention time. It also cleans the global knowledge model 307, removing service session and network connection knowledge that is no longer accessed by knowledge in snapshots.

The SSAO engine 300 further includes a Knowledge Persistence functional block 329 which is used to load static knowledge from persistent storage 331 at system start up and to store knowledge that has been identified as being useful for off-line reporting and analysis to persistent storage.

The Knowledge Persistence component may use a Relational Data Base Management System (RDBMS), raw files holding knowledge in RDF, or a semantic store such as Sesame (Sesame is a Java framework for storing and querying RDF data, see http://www.openrdf.org/) to persist knowledge.

The SSAO engine 300 further includes an interface 333 which publishes public interfaces and supplies knowledge to external systems 335 and User Interfaces 337. It publishes its interfaces using a machine interface such as Web Services or Java RMI.

The interface 333 may retrieve knowledge from the knowledge base directly or may use the Knowledge Querying functional block 319 to query the knowledge base indirectly.

Figure 4:
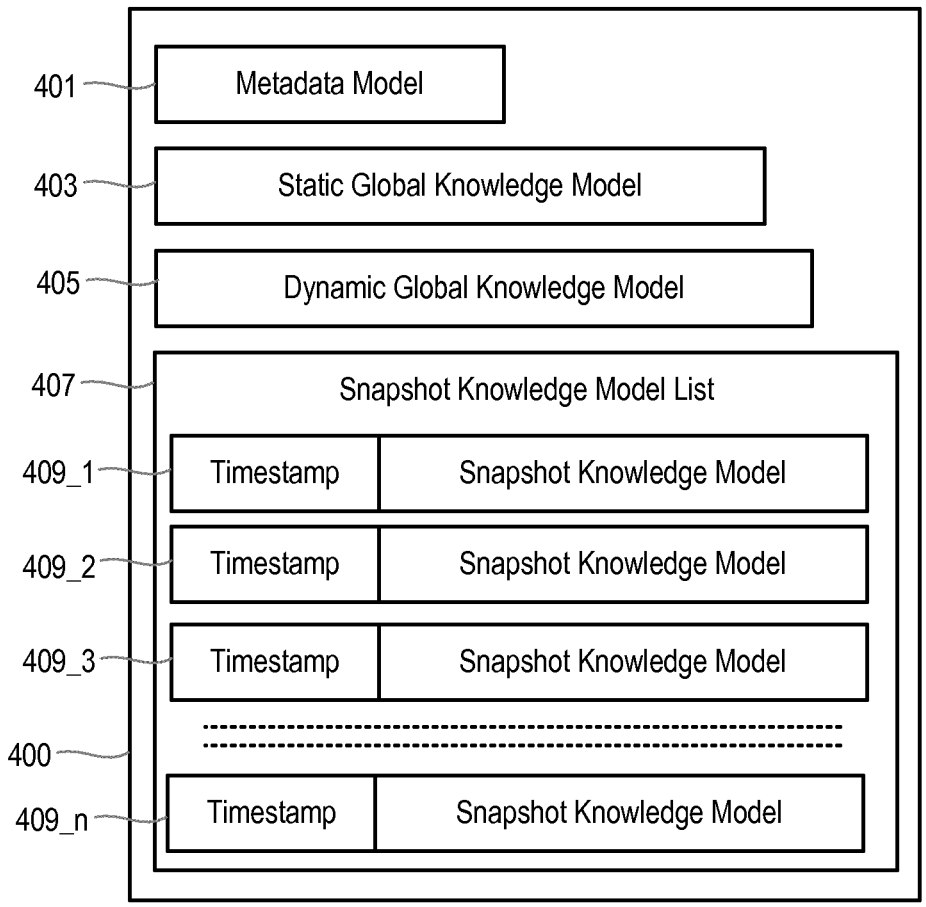
FIG. 4 is a schematic of the structure of the knowledge base of the system model according to an embodiment of the present invention.
Figure 5:
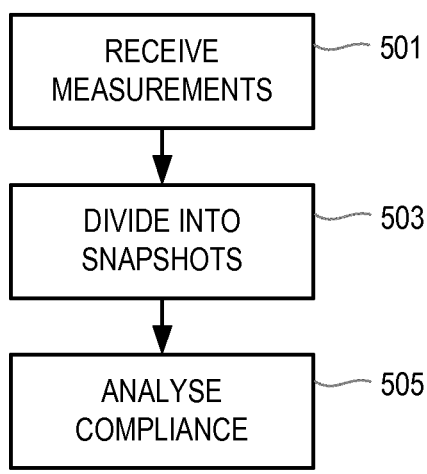
FIG. 5 is a flowchart of a method of analysing a service according to an embodiment of the present invention.

The knowledge in the knowledge base is held in a number of ontology models, typically using a semantic model management framework such as Jena (The Apache Jena project is a java framework for semantic web applications, see http://jena.apache.org/.). The structure of the models in the knowledge base is shown in FIG. 4. To ensure efficient use of memory, all models are held as simple ontologies with asserted individuals, no reasoned or inferred individuals are held in the knowledge base 400.

The knowledge base 400 includes a Metadata model 401 which holds the description of the structure of the ontology, a Static Global Knowledge Model 403 which holds individuals that are static or configured such as user expectations, and a Dynamic Global Knowledge Model 405 which holds individuals that are loaded from incoming service session knowledge and do not change over the duration of service sessions such as session users. The knowledge base 400 maintains a list 407 of snapshot models 409_1 to 409_$n$, one for each snapshot. The Snapshot models 409_1 to 409_$n$ hold individuals that vary over the life of a service session such as quality metrics and network latency.

The operation of the apparatus will now be described with reference to FIGS. 5 to 15.

Figure 8A:
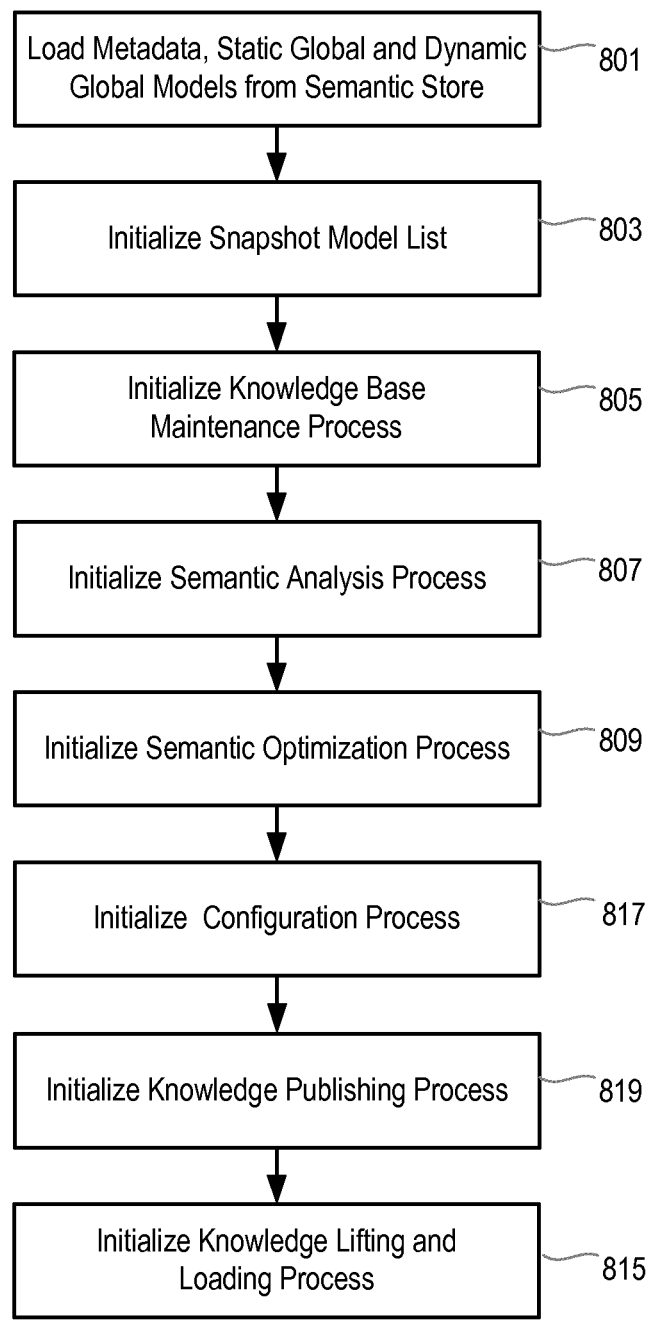
FIGS. 8a and 8b are flowcharts illustrating the start up and shutdown procedure of the apparatus according to an embodiment of the present invention.
Figure 8B:
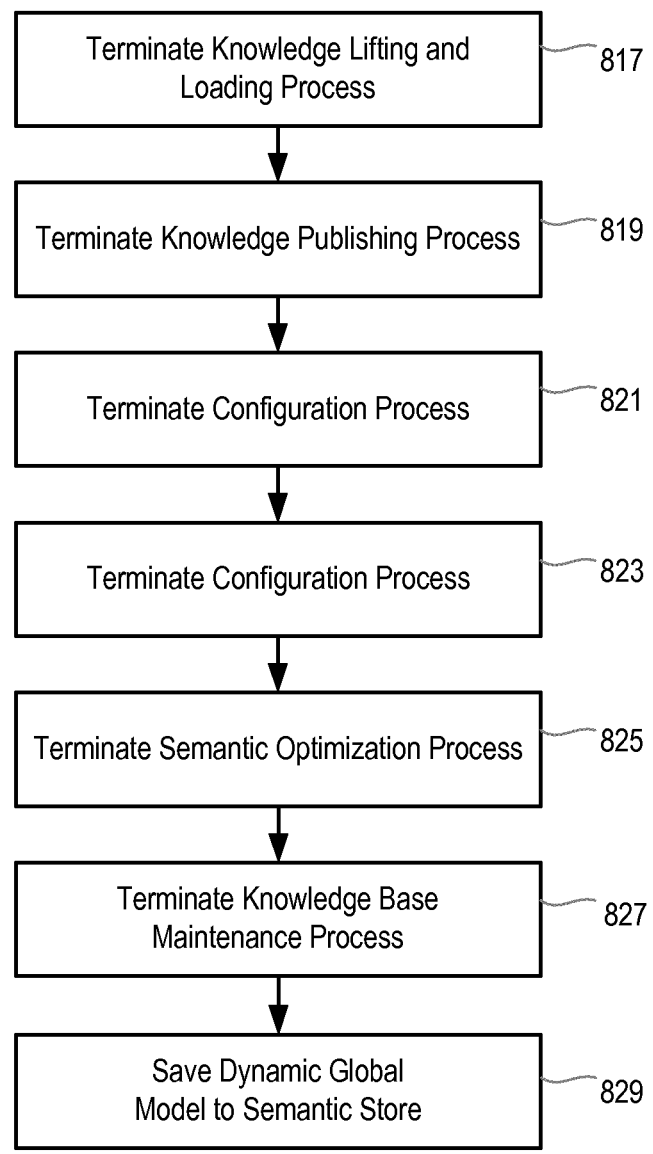

The receiver module 201 receives, 501, a plurality of measurements of at least one performance parameter of a network 317 providing a service such as a telecommunication service to an end user in a service session from external sources such as terminals 315 or from other data sources 313. These are loaded into the semantic model via the knowledge lifting functional block 311 as shown in FIGS. 8a and 8b and described in more detail below. The knowledge (for a plurality of snapshots) is maintained in the knowledge base 303. The analyser module 205 (semantic analyser functional block 321) analyses 505, the service by determining the compliance of the received measurements to the expectations of the end user for that service session within a snapshot.

Figure 6:
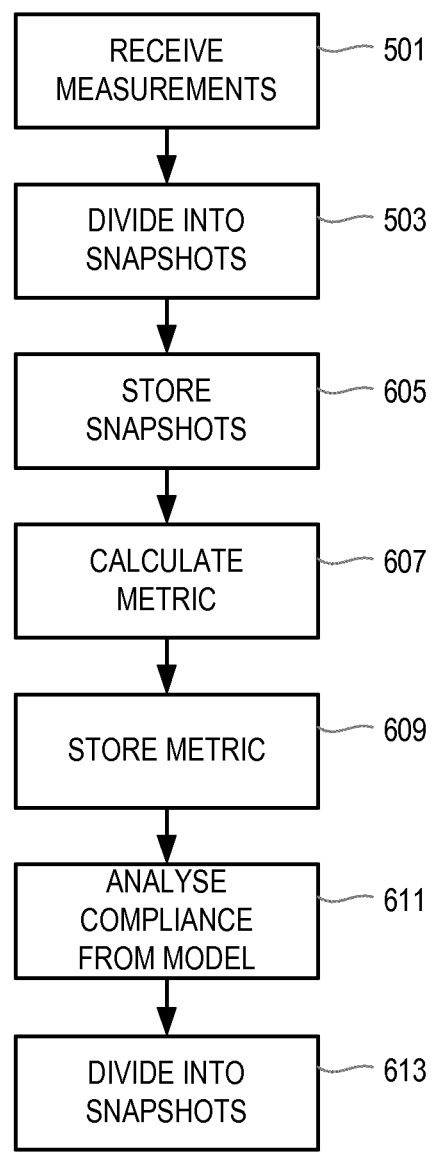
FIG. 6 is a more detailed flowchart of the method of analysing a service of FIG. 5.

In more detail as shown in FIG. 6, the SSAO engine 300 further includes an analyser functional block 321, which runs periodically at a configurable interval. It analyses snapshots that has been updated since the last run. For the snapshots, it calculates a metric, 607, that represents the compliance of each service session to its expectations and stores that metric, 609, into that service session individual in the knowledge base.

The user expectations are stored in corresponding snapshots 309_1 to 309_n in the knowledge base.

Figure 7:
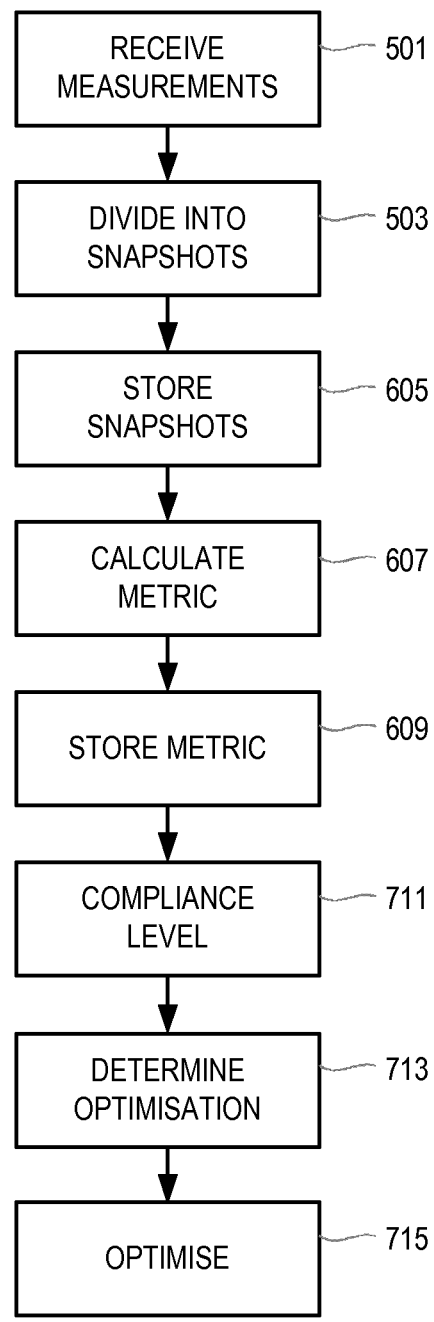
FIG. 7 is a flowchart of a method of optimising the provision of services according to an embodiment of the present invention.

As shown in FIG. 7, the SSAO engine 300 further includes an optimiser functional block 323, which runs periodically at a configurable interval. It looks at the compliance level of the set of services in the most recent snapshot, 711. If some services are not conforming to expectations, it assesses applied optimizations, 715, and the priority of each service session in the snapshot to determine if and what network optimization should be applied to improve the level of conformance of services. It stores the recommended optimization to the knowledge base and calls the Optimization Activation functional block 323 to activate optimizations on the network 317.

At start up, the SSAO engine executes the processes shown in FIG. 8a and at shutdown, the SSAO engine executes the processes shown in FIG. 8b.

At start up, FIG. 8a, the engine 300 initializes the knowledge base 303 by populating, 801, its metadata 306 and global knowledge models 307 from the semantic store. The engine 300 then initializes, 803, the snapshot model list 507, which will hold snapshot models. Finally, it initializes processes to carry out analysis, 807, optimization, 809, and maintenance, 805, as well as processes to allow loading, 815, configuration, 817, and publishing, 819, of knowledge.

At shut down, FIG. 8b, the engine 300 terminates, 817, 819, 821, 823, 825, 827, processes started at start up, saves, 829, the dynamic global knowledge to the semantic store, and exits.

Figure 9:
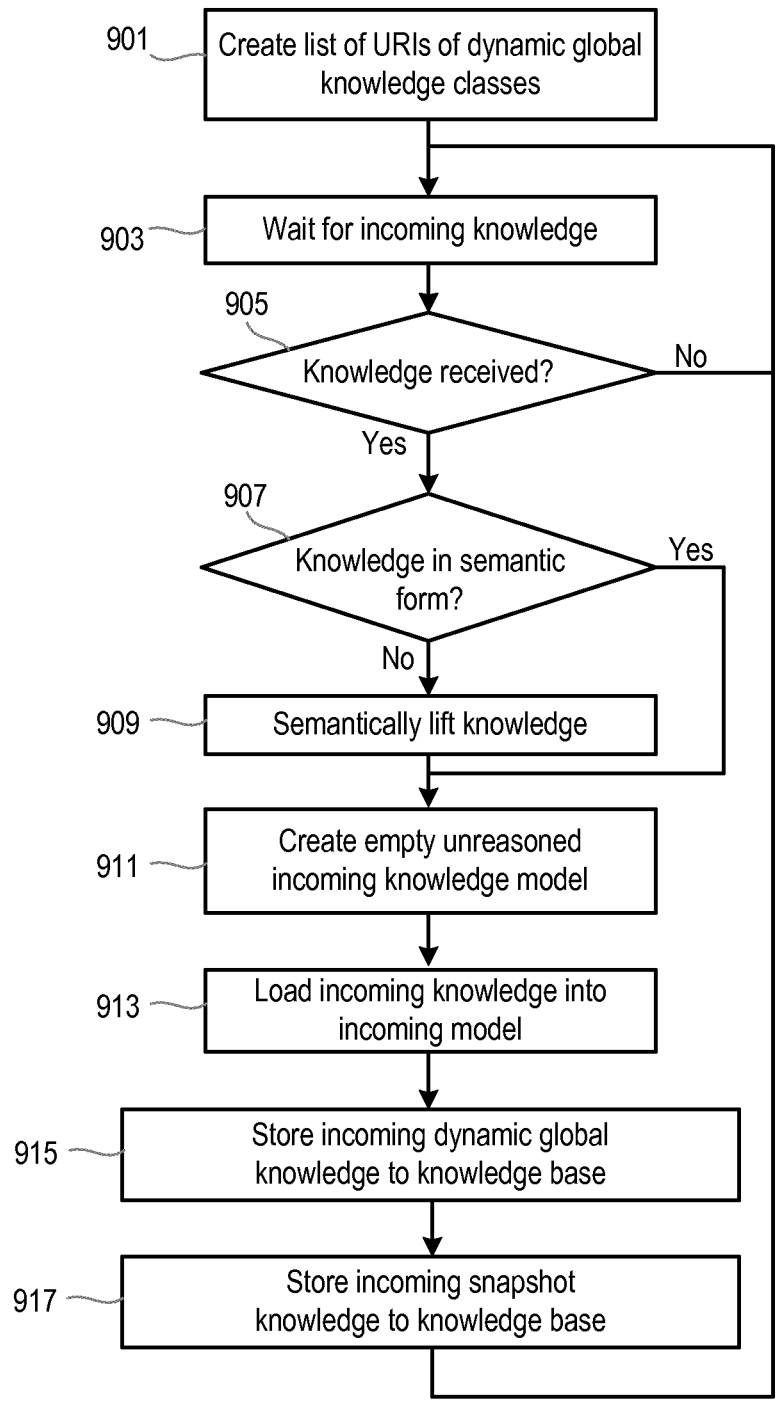
Figure 10A:
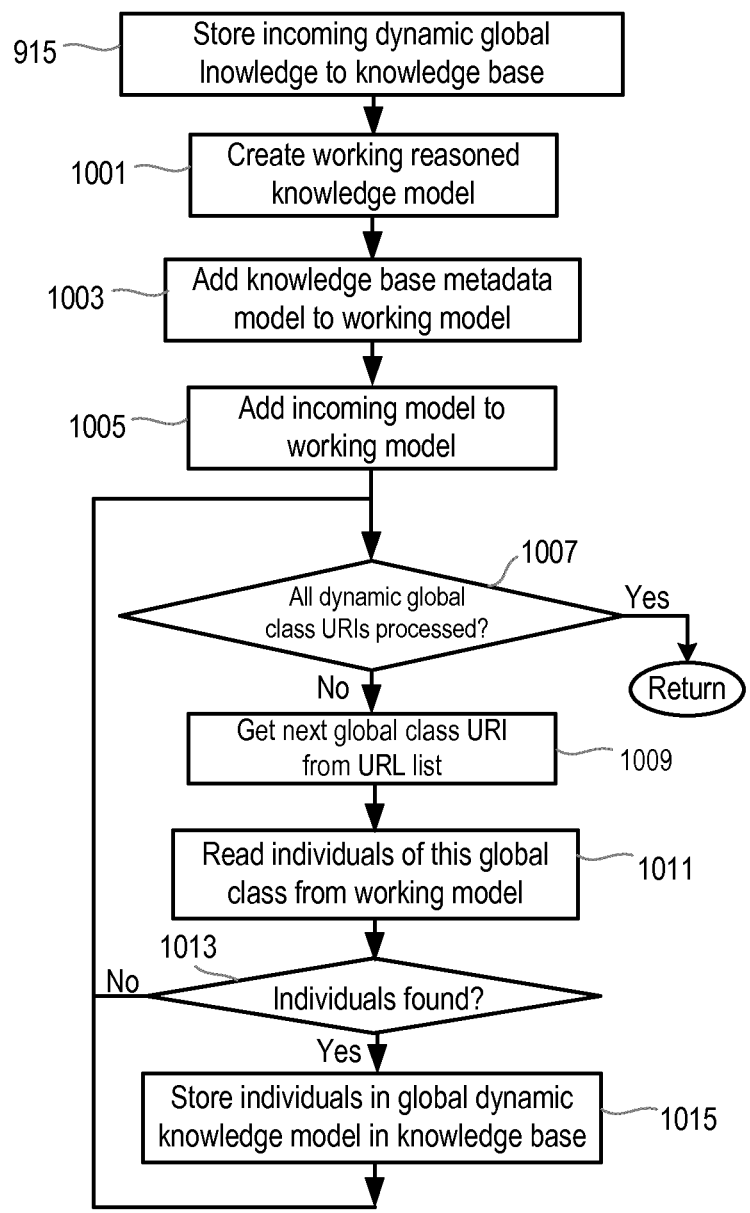
FIGS. 10a and 10b are flowcharts of the Loading and Lifting subflows of FIG. 9.
Figure 10B:
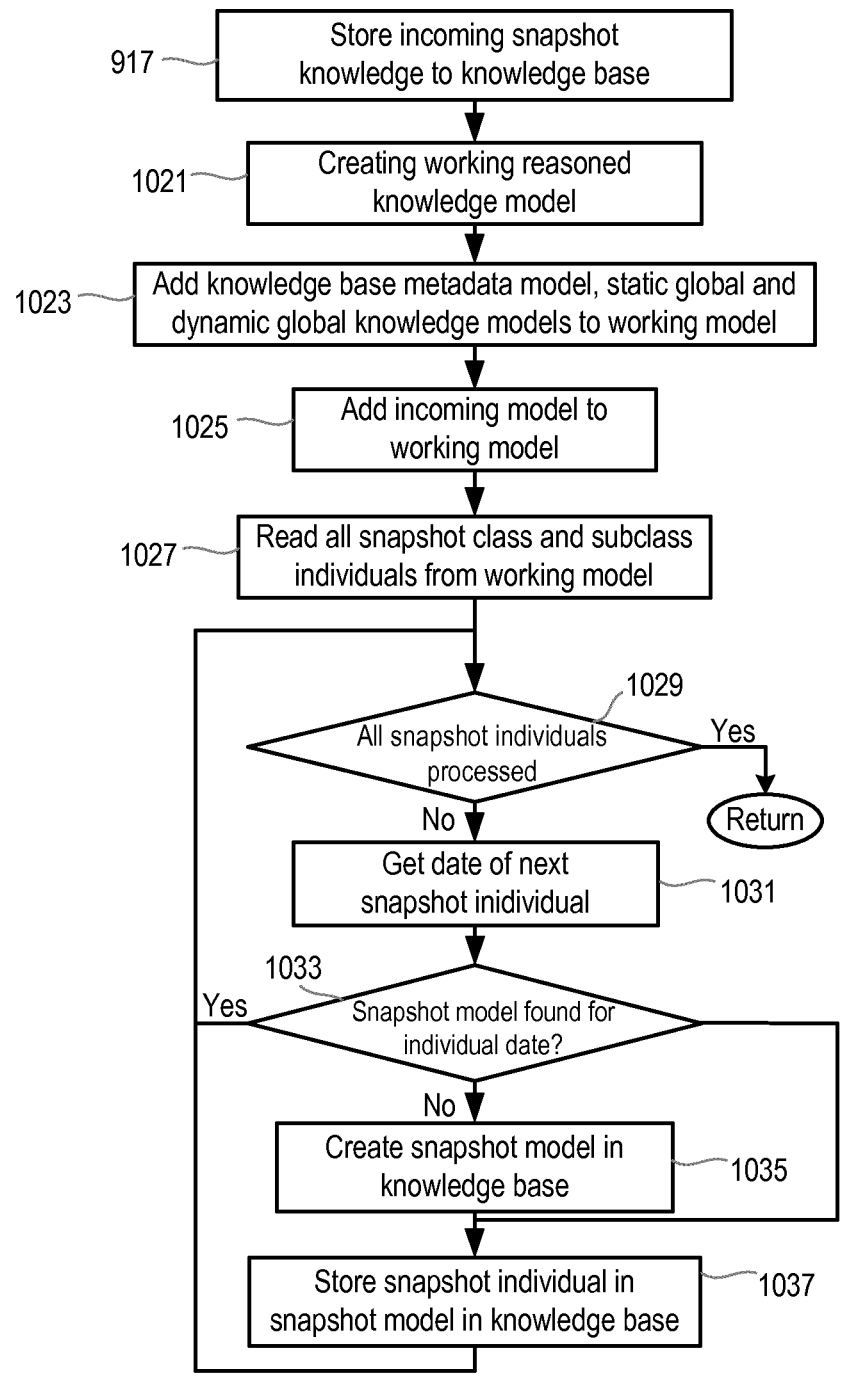

During knowledge lifting and loading, the SSAO engine 300 executes the processes of FIG. 9 and sub processes shown in FIGS. 10a and 10b.

Knowledge loading creates, 901, and maintains a list of URIs of classes for the Dynamic Global Knowledge model 505.

The SSAO engine 300 waits for incoming knowledge, 903. When knowledge is received, 905, it is determined whether it is in semantic form. If it is not in semantic form then it is semantically lifted, 909. A raw unreasoned model is created, 911, and the semantic, incoming knowledge is then loaded, 913, into the raw unreasoned model that is used to hold the knowledge temporarily during the loading process.

Next, the incoming dynamic global knowledge is stored, 915, in the knowledge base 303 according the process of FIG. 10a. In order to update the Dynamic Global Knowledge Model 505 with new incoming individuals, it is necessary to create, 1001, a temporary working reasoned model. The Semantic Service Management metadata is added, 1003, to the temporary working reasoned model so that the types of classes in the incoming knowledge can be resolved. The incoming model is added, 1005, to this working reasoned model.

The temporary working model is searched, 1007, 1009, 1011, 1013 for individuals of each of these classes. Each found individual is inserted, 1015, into the Dynamic Global Knowledge Model in the knowledge base.

Next the snapshot models are updated, 917, with new incoming individuals as shown in FIG. 10b. In order to update the snapshot models, it is necessary to create, 1021, a temporary working reasoned model, 1023, that contains the metadata, and all existing static and dynamic models (but not snapshots) to the temporary working reasoned model so that the relationships between the concepts in the ontology are constructed correctly, and that references from snapshot individuals to static and dynamic global knowledge can be constructed. The incoming model is added, 1025, to this working reasoned model and all snapshot class and subclass individuals from the working model are read, 1027.

Knowledge loading now looks, 1029, for all individuals in the temporary reasoned model that are snapshot individuals. These snapshot individuals may be location snapshot, connection experience snapshots, or service experience snapshots.

Each snapshot individual is inserted in turn into the knowledge base. The date on a snapshot individual is used, 1031, to determine which snapshot model an individual should be inserted into. If a snapshot model does not exist, 1033, for the snapshot individual, it is created, 1035, 1037, on the knowledge base.

Figure 11A:
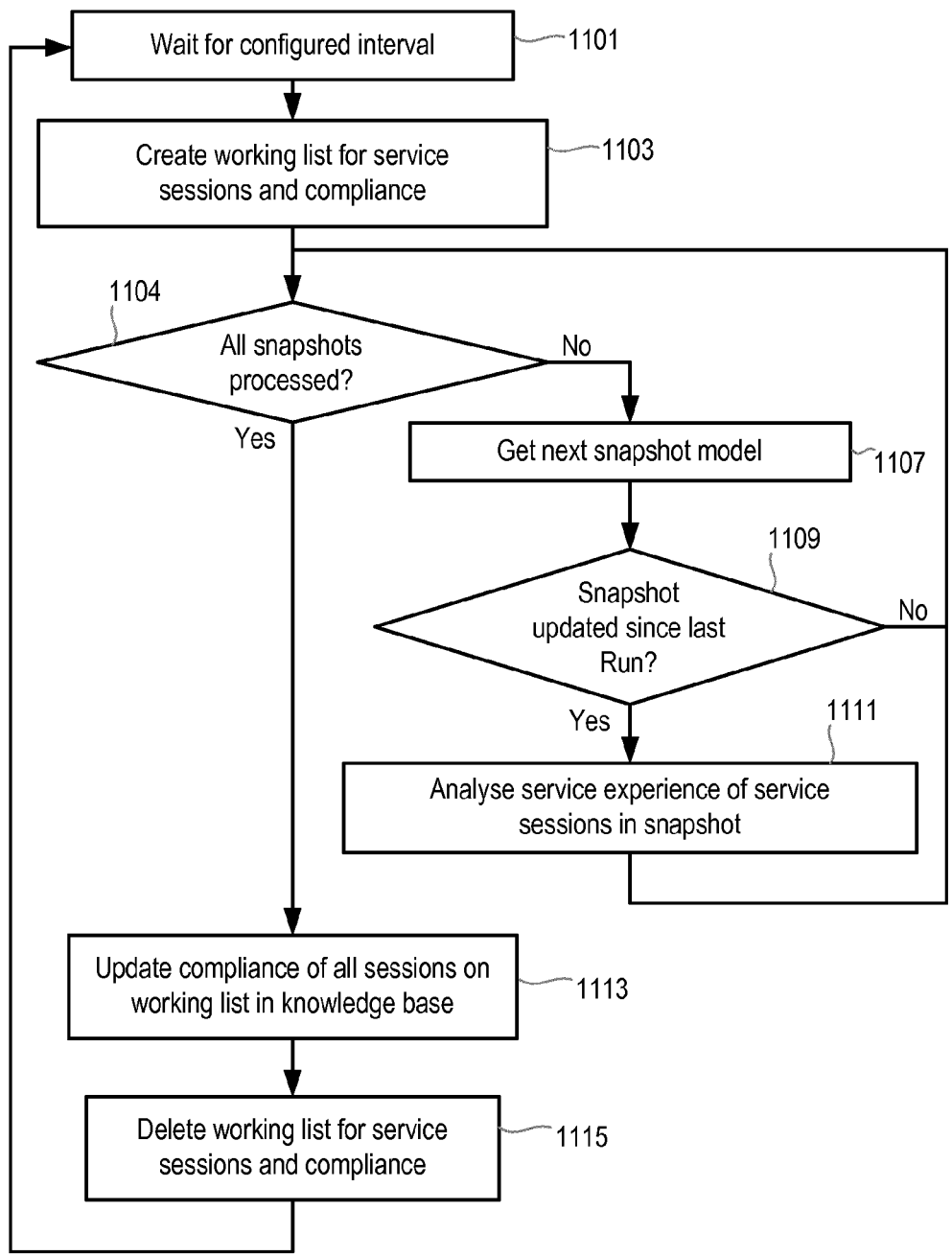
FIGS. 11a and 11b are flowcharts illustrating the semantic service analysis of an embodiment of the present invention.
Figure 11B:
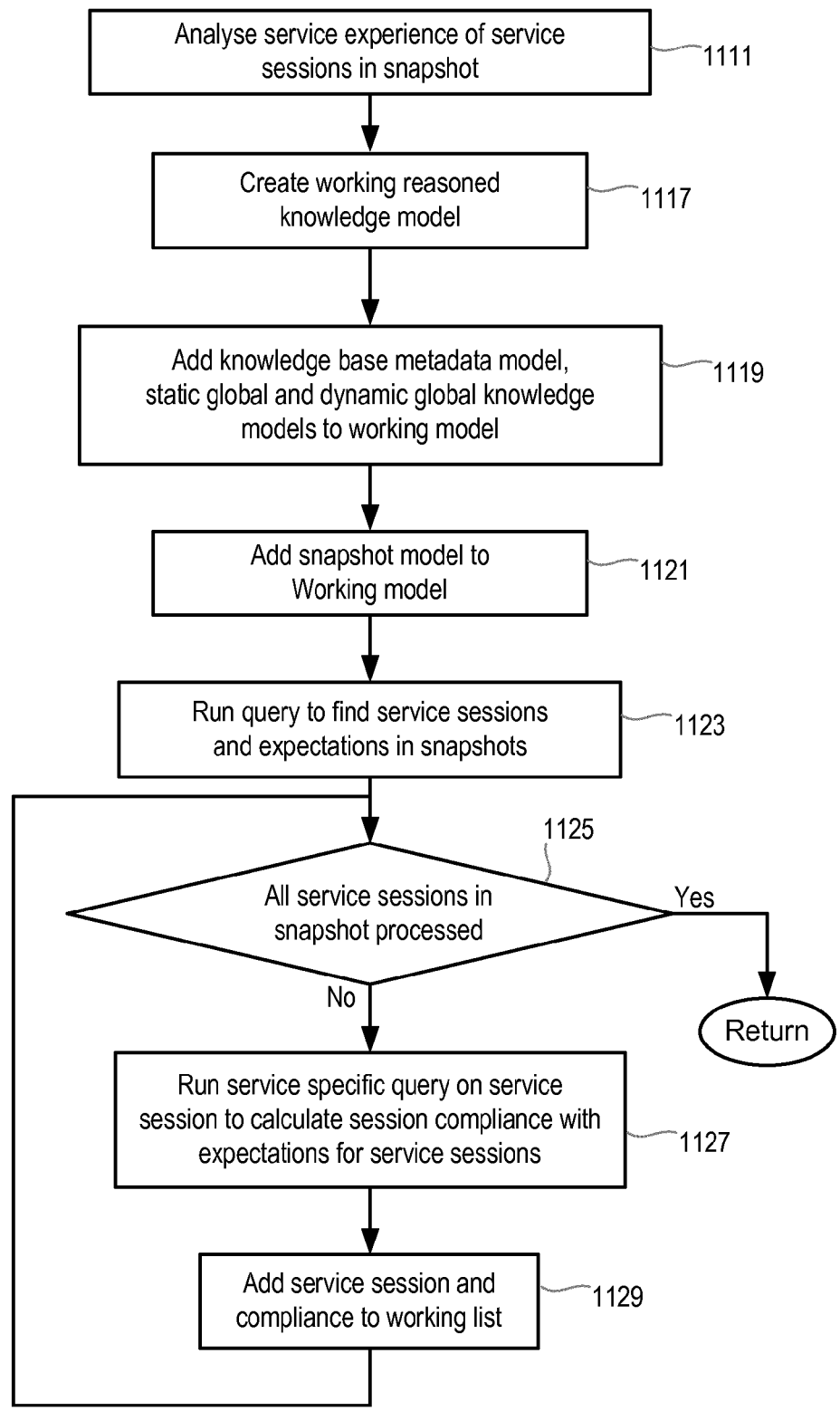

The analyser module 205 (semantic service analyser 321) of the SSAO engine 300 analyses the services by the process shown in FIGS. 11a and 11b. The compliance of each service session found in a snapshot is analysed to determine its compliance with its expectations. That compliance value is stored as a data property on the service session individual in the knowledge base 303.

Semantic service analysis runs, 1101, periodically at a configured interval. For efficiency reasons, the analysis process creates, 1103, a working list of service session snapshot individuals and their compliance. All individuals on the list are updated, 1113, in the knowledge base 303 at once at the end of an analysis run, 1111, rather than updating the compliance of each individual as separate operations.

Each snapshot that has been updated, 1109, since the last analysis run is analysed, 1111, in turn. A working reasoned model is created, 1117, to which the metadata and all global knowledge is added, 1119. The current snapshot is also added, 1121, to this model. This means that reasoning is restricted to global individuals and the individuals of a single snapshot, thus reducing the scope over which reasoning and queries execute. A query is run, 1127, on the reasoned model to find the service experience snapshots and their service expectations. This query is generic for all service sessions because it uses the relationship structure of the Semantic Service Management Ontology to find service experience snapshots and their respective service expectation specifications.

Once the list of service experience snapshots and expectations have been found, the SSAO engine iterates over the list, acting on each service experience snapshot in turn. It looks up a service specific query for each service experience snapshot using the service name property of the snapshot. That query is executed, 1127, to calculate the compliance value of the service experience snapshot with its expectations. That value and the service experience snapshot individual are added, 1129, to the snapshot individual compliance list.

Once all snapshot individuals and snapshots have been analysed, 1125, the SSAO engine 300 updates, 1113, the compliance data property on all service experience snapshot individuals on the snapshot individual compliance list to the knowledge base and deletes, 1115, the list.

Figure 12:
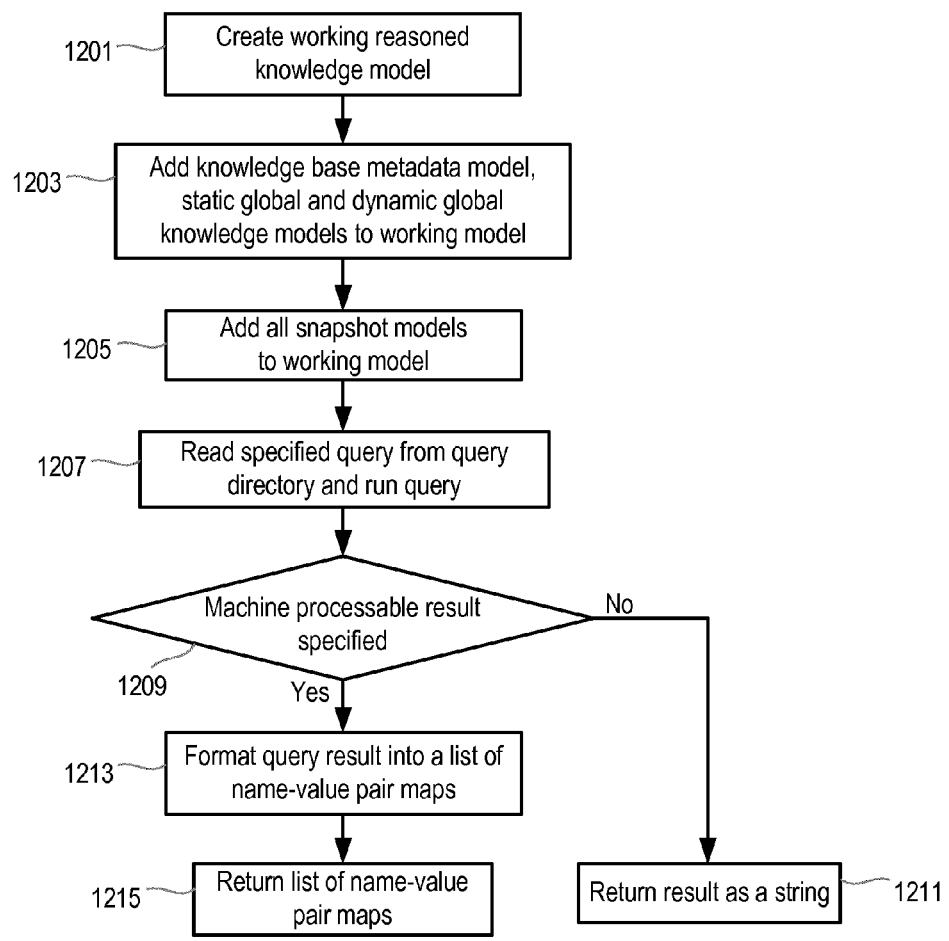
FIG. 12 is a flowchart illustrating the knowledge base querying according to an embodiment of the present invention.

Details of the knowledge querying are shown in FIG. 12.

Queries run over the entire scope of the knowledge base 303 so, when query execution is requested, a reasoned model is constructed, 1201, which contains, 1203, the metadata, all global knowledge and all snapshots, 1205. The requested query is read, 1207, from the query directory for each query, which means that queries can be edited during run time in the system. The query is then executed on the reasoned model.

Knowledge querying can return the results of queries as a human readable string, which contains a textual representation of the query result. It can also return the query results as a list of name value pair maps. If a machine-processable result is specified, 1209, a list of name-value pairs maps are formatted, 1213, and returned, 1215, and if a non-machine processable result is specified, 1209, a human readable string is returned, 1211.

Figure 13:
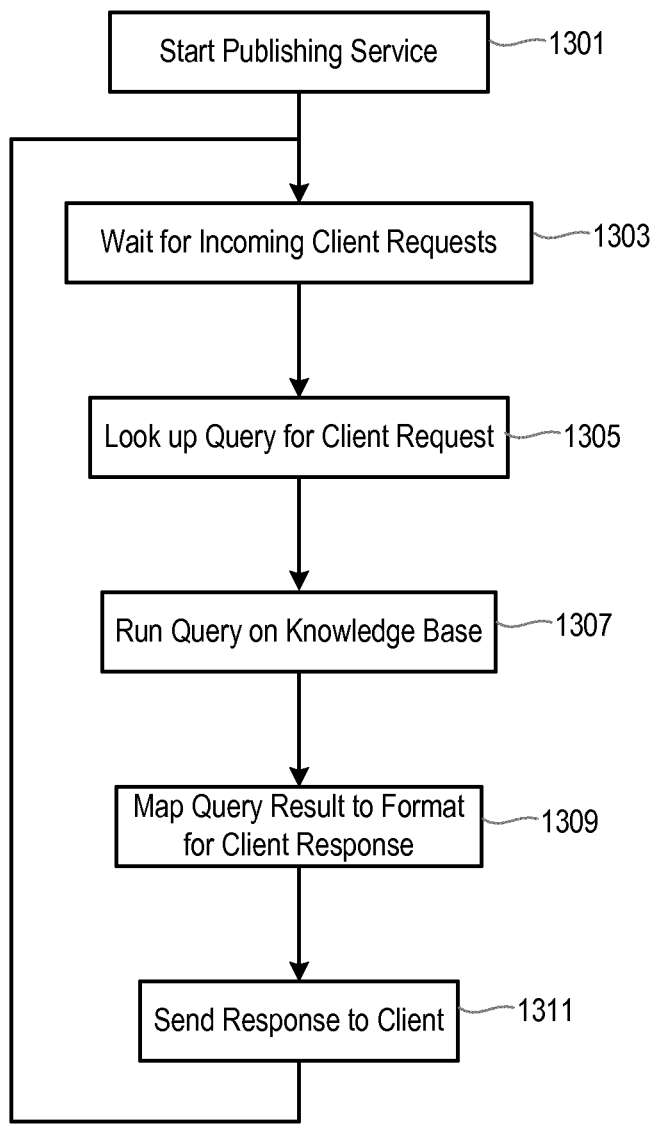
FIG. 13 is a flowchart illustrating the publishing of the knowledge of the knowledge base according to an embodiment of the present invention.

The SSAO engine 300 uses the process shown in FIG. 13 to publish knowledge.

The process starts, 1301, a publishing service, which may be a Java RMI server or any other server to which clients (User Interfaces or External Systems) can connect. The process then waits, 1303, for client requests.

When a client request is received, the request is matched, 1305, with a query name. The query is run, 1307, using the process described with reference to FIG. 12 above. The results of the query are mapped, 1309, into the format required for the client response and the response is sent, 1311, to the client.

Figure 14A:
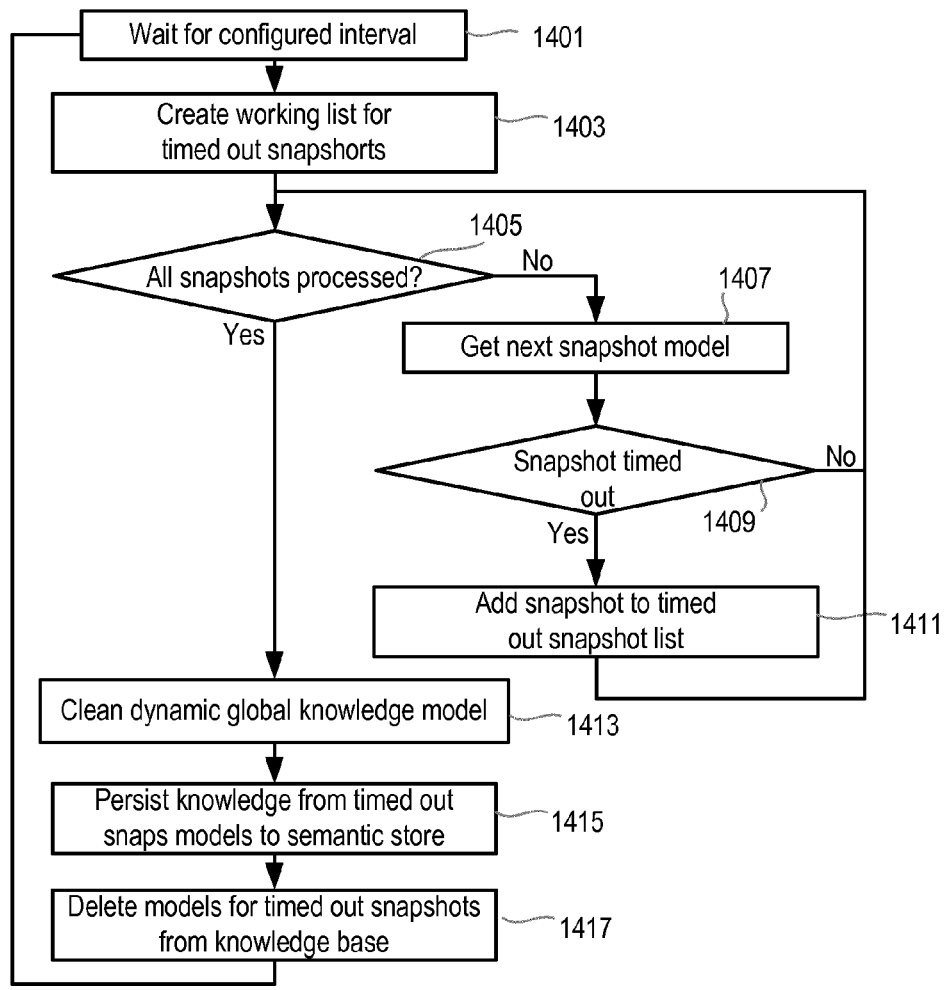
FIGS. 14a and 14b are flowcharts illustrating the maintenance of the knowledge base according to an embodiment of the present invention.
Figure 14B:
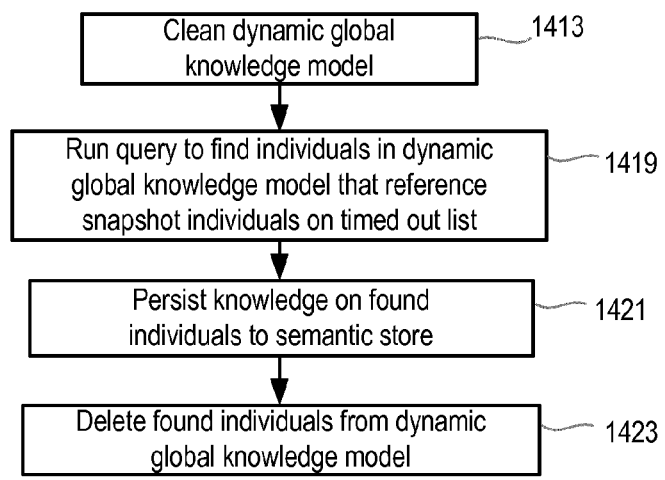

Because the knowledge base 303 is held in memory, it is imperative to have active maintenance of the knowledge base 303 to ensure memory usage is optimized. The maintenance process is shown in FIGS. 14a and 14b.

Knowledge Base maintenance runs periodically at a configured interval, 1401. Snapshot models are only maintained in memory for a configurable retention period, after which time they are deleted, 1417. The maintenance operation scans, 1405, 1407 the current snapshot model list and determines, 1409, which snapshots have timed out; that is are in memory longer than the retention period. Snapshots that have timed out are added, 1411, to a timed out list.

When the SSAO engine 300 has built the list of timed out snapshot models, it uses that list to find, 1413, dynamic global knowledge individuals that reference only individuals in the timed out snapshot list. Dynamic global knowledge individuals of types that have been tagged for persistence are stored, 1415, to the semantic store and the individuals are deleted from the knowledge base 303.

The SSAO engine 300 then iterates over the list of timed out models and stores any individuals whose class has been tagged for persistence to the semantic store. Each snapshot model is then deleted, 1417, from the knowledge base 303.

Figure 15:
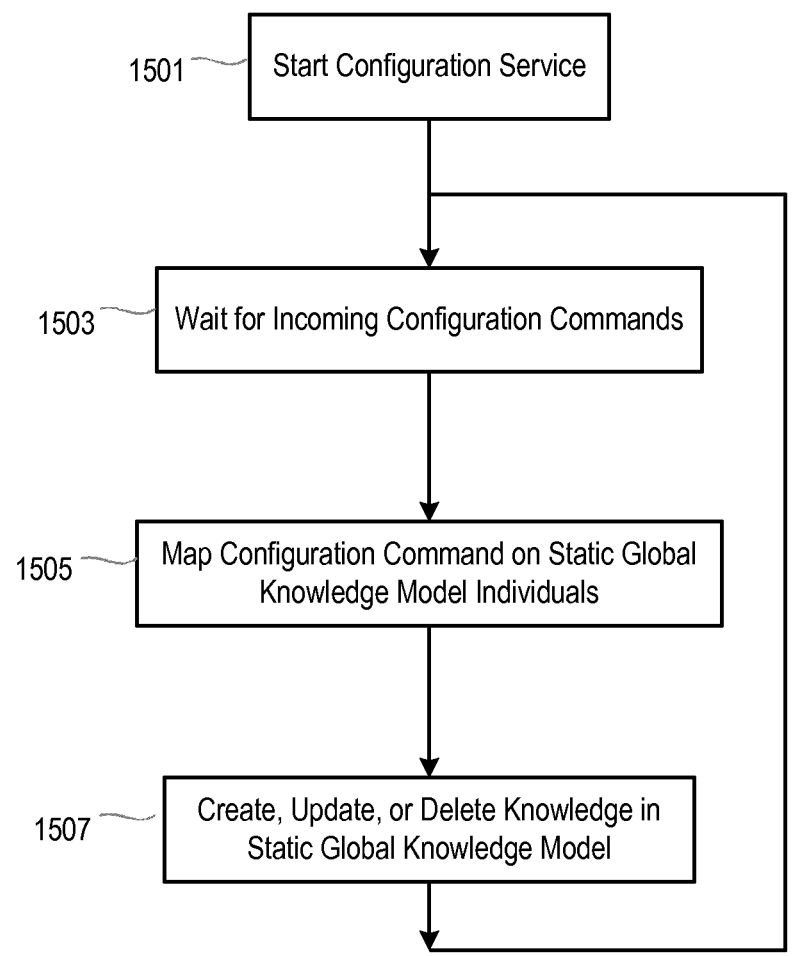
FIG. 15 is a flowchart illustrating configuration of static knowledge according to an embodiment of the present invention.

The SSAO engine 300 uses the process shown in FIG. 15 to allow configuration of knowledge in the Static Global Knowledge Model.

The process starts, 1501, a configuration service, which may be a Java RMI server or any other server to which clients (Configuration Clients or External Systems) can connect. The process then waits, 1503, for client configuration commands.

When a configuration command is received, the command is mapped, 1505, to create, update, or delete operations, 1507, on individuals in the Static Global Knowledge Model. The appropriate configuration operation is executed on the knowledge base and the result of the operation is returned to the calling client.

In an example, multiple users have access to a broadband network for using web browsing, video on demand, and file transfer services.

A network operator monitors, analyses, and optimizes usage of the Broadband Access Network connections using apparatus according to an embodiment of the present invention. The network operator sets the service expectations and priority for each service for each user in that system.

The SSAO engine 300 monitors the service usage on the connection, checks if any services are not meeting expectations. If some services are not meeting expectations, the system selects policies that limit bandwidth usage by lower priority service sessions and asks the network to apply those policies.

The SSAO engine 300 tracks how well optimizations perform over time. The level of limiting applied is incrementally increased or decreased as the compliance of unlimited services with expectations decreases and increases.

At certain times of the day the broadband access network connections of the example may become congested as a number of services sessions are started by each user, being a combination of any of the available services, for example web browsing, video on demand, file transfer and telephony.

All the service sessions fail to meet expectations. The SSAO engine sees that the capacity of the broadband access network connection has been exceeded. It may limit the bandwidth of the file transfer session, which has the lowest priority. The remaining three sessions now meet expectations.

As more bandwidth becomes available as service sessions of higher priority end, the limit on the file transfer session can be reduced and as yet more bandwidth becomes available, the limit on the file transfer session can be removed.

The apparatus of the present invention can also optimise provision of services caused by impairment in the broadband access network connection of the example above.

In another example, consider multiple service sessions are running concurrently.

All service sessions meet expectations initially. However, after some minutes, certain service sessions begin to fail to meet expectations. The SSAO engine determines that the cause is impairment in the network. A service session having a lower priority may be limited so that the remaining sessions meet expectations again.

However, after some more minutes, the current services fail to meet expectations again. The SSAO engine determines that the network impairment has got worse. It limits a service session having a higher priority because the service sessions having lower priorities, do not consume enough bandwidth to alleviate the problem on the highest priority session.

The SSAO engine continues to monitor the sessions and the network connection. After some minutes, it is determined that the network impairment has lessened, the limitation on the services sessions are removed and it is determined that all unlimited services meet expectations.

After some more minutes, the SSAO engine notices that the network has returned to operation within normal parameters. It removes the limitation on all the service sessions and all services now meet expectations.

In a preferred embodiment the apparatus 200 is implemented as a management node for a telecommunications network. In one particular embodiment it may be implemented as a network management node providing performance management OSS (Operations Support Systems) solutions for mobile broadband. In an alternative embodiment the apparatus 200 may be implemented as an auto configuration server (ACS). ACS is a network device that provides device management for TR-069 (DSL Forum Technical Report 069) based Customer Premise Equipment, such as broadband gateways, xDSL (Digital Subscriber Line) routers, VoIP (Voice over Internet Protocol) gateways, wireless access points, etc.

Although embodiments of the present invention have been illustrated in the accompanying drawings and described in the foregoing detailed description, it will be understood that the invention is not limited to the embodiments disclosed, but is capable of numerous modifications without departing from the scope of the invention as set out in the following claims. In the claims, the word "comprising" does not exclude other elements or steps, and the indefinite article "a" or "an" does not exclude a plurality. Any reference signs in the claims should not be construed as limiting the scope.

The invention claimed is:

1. A method of analyzing a service provided to an end user in a service session, the method comprising the steps:
   receiving, at an interface of a server, a plurality of measurements of at least one performance parameter of a network providing a service to an end user in a service session;
   dividing, via the server, the received plurality of measurements of the at least one performance parameter into a plurality of snapshots;
   analyzing, via the server, the service by determining the compliance of the received measurements to the expectations of the end user for that service session within a snapshot; and
   in response to determining that the service is not in compliance with the expectations of the end user:
      determining a network optimization to apply to the network to improve the compliance of the service based on a priority level assigned to the service session; and
      optimizing a performance of the network based on the determination of what network optimization should be applied.

2. The method according to claim 1 wherein the snapshot comprises a time interval.

3. The method according to claim 2, wherein the time interval is configurable.

4. The method according to claim 1, wherein the method further comprises:
   storing, in a memory, the end user's expectations of the service session in the plurality of snapshots.

5. The method according to claim 4, wherein the method further comprises calculating a metric that represents the compliance of the service session to the expectations and storing the calculated metric into the service session.

6. The method according to claim 5, wherein the step of analyzing the service comprises the steps of:
   creating a semantic model of a plurality of concepts in the end user communication service domain, specifying the concepts and properties of concepts, relationships between concepts; and
   analyzing the service defined by the created semantic model.

7. The method according to claim 6, wherein the step of storing the end user's expectations and storing the calculated metric comprise the step of storing the end user's expectations and/or storing the calculated metric in a knowledge base of the semantic model for use in updating the semantic model.

8. The method according to claim 6, wherein each of the plurality of concepts in the end user communication service domain are assigned an importance level and the step of creating the semantic model comprises the step of:
   creating the semantic model of the concepts having importance level above a defined threshold in the end user communication service domain.

9. Apparatus for analyzing a service provided to an end user in a service session, the apparatus comprising:
   a hardware interlace configured to receive a plurality of measurements of at least one performance parameter of a network providing a service to an end user in a service session and to divide the received plurality of measurements of the at least one performance parameter into a plurality of snapshots;
   a processor communicatively coupled to the interface, the processor configured to analyze the service by determining the compliance of the received measurements to the expectations of the end user for that service session within a snapshot; and
   in response to determining that the service is not in compliance with the expectation of the end user, the processor is further configured to:
   determine a network optimization to apply to the network to improve the compliance of the service based on a priority level assigned to the service session; and
   optimize a performance of the network based on the determination of what network optimization should be applied.

10. Apparatus according to claim 9, wherein the apparatus further comprises a storage device configured to store the end user's expectations of a service session in the plurality of snapshots.

11. Apparatus according to claim 10, wherein the processor is further configured to calculate a metric that represents the compliance of the service session to its expectations; and the storage device is further configured to store the calculated metric into the service session.

12. Apparatus according to claim 11, wherein the processor is further configured to create a semantic model of a plurality of concepts in the end user communication service domain, specifying the concepts and properties of concepts, relationships between concepts, and to analyze the service defined by the created semantic model.

13. Apparatus according to claim 12, wherein the processor is further configured to access the storage device for retrieving the end user's expectations and/or the calculated metric for the knowledge base of the semantic model for use in creating the semantic model.

14. A management node comprising an apparatus as defined in claim 10.

15. The management node according to claim 14 comprising an auto configuration server.

* * * * *